(12) United States Patent
Liu et al.

(10) Patent No.: US 11,194,549 B2
(45) Date of Patent: Dec. 7, 2021

(54) MATRIX MULTIPLICATION SYSTEM, APPARATUS AND METHOD

(71) Applicant: Arm Limited, Cambridge (GB)

(72) Inventors: Zhi-Gang Liu, Westford, MA (US); Paul Nicholas Whatmough, Cambridge, MA (US)

(73) Assignee: Arm Limited, Cambridge (GB)

( * ) Notice: Subject to any disclaimer, the term of this patent is extended or adjusted under 35 U.S.C. 154(b) by 131 days.

(21) Appl. No.: 16/663,887

(22) Filed: Oct. 25, 2019

(65) Prior Publication Data

US 2021/0124560 A1 Apr. 29, 2021

(51) Int. Cl.
G06F 7/544 (2006.01)
G06F 17/16 (2006.01)
G06F 7/527 (2006.01)

(52) U.S. Cl.
CPC .......... *G06F 7/5443* (2013.01); *G06F 7/5272* (2013.01); *G06F 7/5277* (2013.01); *G06F 17/16* (2013.01)

(58) Field of Classification Search
CPC .................. G06F 7/5443; G06F 17/16; G06F 2207/3892; G06F 15/8046; G06F 9/30098; G06F 9/30105; G06F 9/10109; G06F 9/3013; G06N 3/04; G06N 3/06; G06N 3/063
See application file for complete search history.

(56) References Cited

U.S. PATENT DOCUMENTS 8,924,455 B1 * 12/2014 Barman ................ G06F 7/5443
708/607
10,521,488 B1 * 12/2019 Ross ...................... G06F 17/16
(Continued)

OTHER PUBLICATIONS

Z. Liu, P. N. Whatmough and M. Mattina, "Systolic Tensor Array: An Efficient Structured-Sparse GEMM Accelerator for Mobile CNN Inference," in IEEE Computer Architecture Letters, vol. 19, No. 1, pp. 34-37, Jan. 1-Jun. 2020, doi: 10.1109/LCA.2020.2979965. (Year: 2020).*

(Continued)

*Primary Examiner* — Aimee Li
*Assistant Examiner* — Carlo Waje
(74) *Attorney, Agent, or Firm* — Leveque Intellectual Property Law, PC

(57) ABSTRACT

The present disclosure advantageously provides a system, matrix multiply accelerator (MMA) and method for efficiently multiplying matrices. The MMA includes a vector register to store the row vectors of one input matrix, a vector register to store the column vectors of another input matrix, a vector register to store an output matrix, and an array of vector multiply and accumulate (VMAC) units coupled to the vector registers. Each VMAC unit is coupled to at least two row vector signal lines and at least two column vector signal lines, and is configured to calculate the dot product for one element i,j of the output matrix by multiplying each row vector formed from the $i^{th}$ row of the first matrix with a corresponding column vector formed from the $j^{th}$ column of the second matrix to generate intermediate products, and accumulate the intermediate products into a scalar value.

20 Claims, 20 Drawing Sheets

(56) References Cited

U.S. PATENT DOCUMENTS

| | | | |
|---|---|---|---|
| 2018/0314671 A1* | 11/2018 | Zhang | G06F 15/8046 |
| 2019/0042250 A1* | 2/2019 | Anders | G06F 9/30036 |
| 2019/0236049 A1* | 8/2019 | Vantrease | G06F 15/173 |
| 2020/0160226 A1* | 5/2020 | Ross | G06F 7/76 |
| 2020/0334322 A1* | 10/2020 | Liu | G06F 17/16 |

OTHER PUBLICATIONS

Jouppi, Norman P. et al., "In-datacenter performance analysis of a tensor processing unit." 2017 ACM/IEEE 44th Annual International Symposium on Computer Architecture (ISCA) (2017): 1-12.

* cited by examiner

MATRIX MULTIPLICATION SYSTEM, APPARATUS AND METHOD

BACKGROUND

The present disclosure relates to computer systems. More particularly, the present disclosure relates to a matrix multiplication system, apparatus and method.

Matrix multiplication is a fundamental component for many important applications, including machine learning (ML), artificial neural networks (ANNs), convolutional neural networks (CNNs), etc. CNNs are currently very popular for implementing tasks such as image classification. However, CNNs are inefficiently implemented in many devices because CNNs perform a very large number of multiply and accumulate (MAC) operations on very large data structures.

DETAILED DESCRIPTION

Figure 1A:
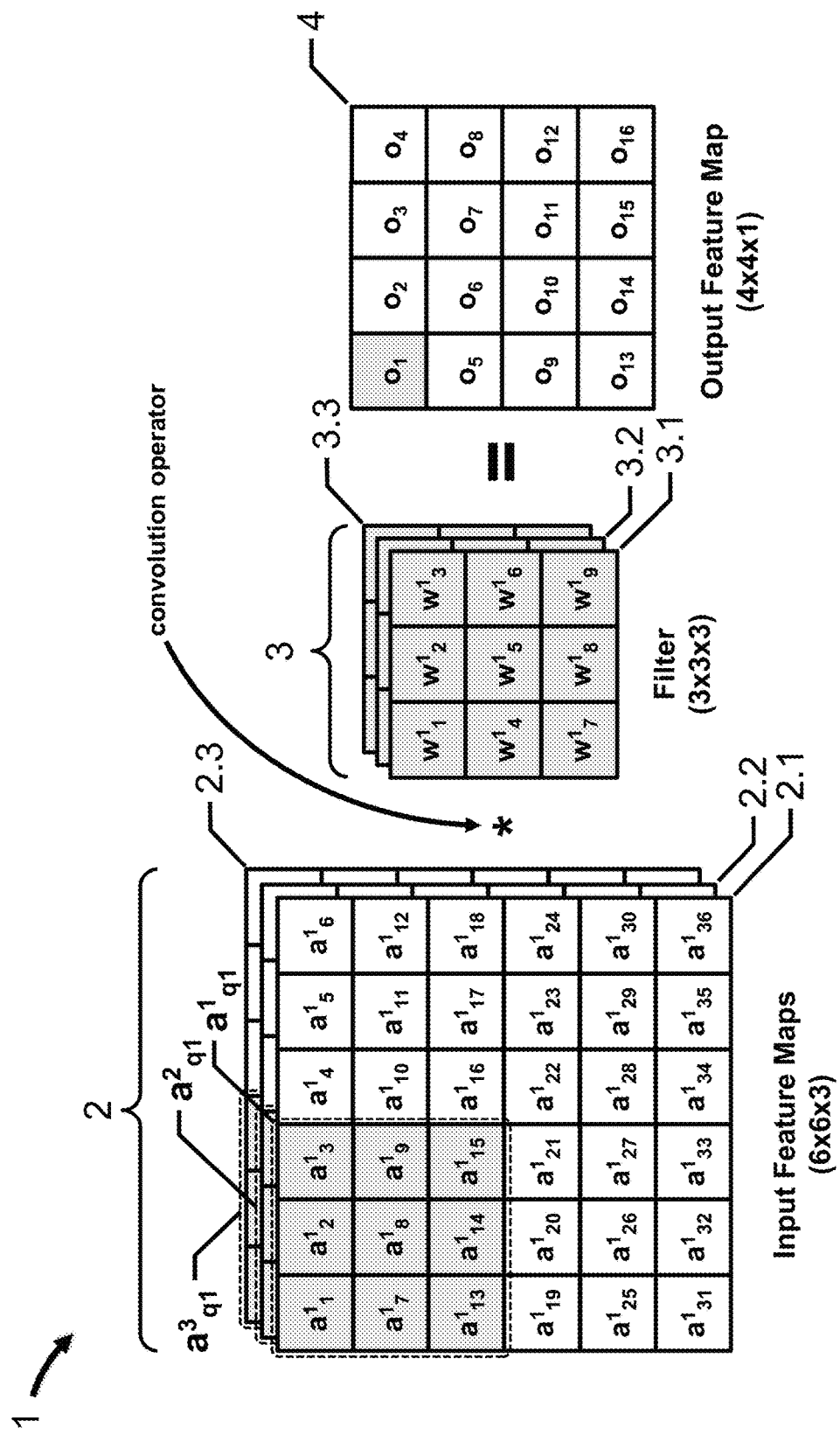
FIG. 1A depicts a convolutional layer calculation for a CNN, in accordance with an embodiment of the present disclosure.

Embodiments of the present disclosure will now be described with reference to the drawing figures, in which like reference numerals refer to like parts throughout.

Embodiments of the present disclosure advantageously provide a system, matrix multiply accelerator and method for efficiently multiplying matrices by performing vector multiply and accumulate (VMAC) operations within each calculation cycle. Hardware power consumption, hardware costs and processing latency are advantageously reduced.

In one embodiment, a system includes a memory, a processor coupled to the memory, and a matrix multiply accelerator (MMA) coupled to the memory and the processor.

The memory is configured to store a first matrix including a plurality of elements, a second matrix including a plurality of elements, and an output matrix including a plurality of elements.

The processor is configured to form the elements of each row of the first matrix into a plurality of row vectors, and form the elements of each column of the second matrix into a plurality of column vectors. Each row vector has the same number of elements, and each row vector has at least two elements. Each column vector has the same number of elements.

The MMA is configured to multiply the first matrix and the second matrix to generate the output matrix, including, for each element i,j of the output matrix, calculate a dot product of the $i^{th}$ row of the first matrix and the $j^{th}$ column of the second matrix by multiplying each row vector formed from the $i^{th}$ row of the first matrix with a corresponding column vector formed from the $j^{th}$ column of the second matrix to generate intermediate products, and accumulate the intermediate products into a scalar value.

In one embodiment, the MMA includes a first vector register to store the row vectors of the first matrix, a second vector register to store the column vectors of the second matrix, an output vector register to store the output matrix, and an array of vector multiply and accumulate (VMAC) units, coupled to the first vector register, the second vector register and the output vector register. Each VMAC unit is coupled to at least two row vector signal lines and at least two column vector signal lines, and each VMAC unit is configured to calculate the dot product for one element i,j of the output matrix.

Matrix multiplication is used extensively by ANNs. An ANN models the relationships between input data or signals and output data or signals using a network of interconnected nodes that is trained through a learning process. The nodes are arranged into various layers, including, for example, an input layer, one or more hidden layers, and an output layer. The input layer receives input data, such as, for example, image data, and the output layer generates output data, such as, for example, a probability that the image data contains a known object. Each hidden layer provides at least a partial transformation of the input data to the output data. A deep neural network (DNN) has multiple hidden layers in order to model complex, nonlinear relationships between input data and output data.

In a fully-connected, feedforward ANN, each node is connected to all of the nodes in the preceding layer, as well as to all of the nodes in the subsequent layer. For example, each input layer node is connected to each hidden layer node, each hidden layer node is connected to each input layer node and each output layer node, and each output layer node is connected to each hidden layer node. Additional hidden layers are similarly interconnected. Each connection has a weight value, and each node has an activation function, such as, for example, a linear function, a step function, a sigmoid function, a tanh function, a rectified linear unit (ReLu) function, etc., that determines the output of the node based on the weighted sum of the inputs to the node. The input data propagates from the input layer nodes, through respective connection weights to the hidden layer nodes, and then through respective connection weights to the output layer nodes.

More particularly, at each input node, input data is provided to the activation function for that node, and the output of the activation function is then provided as an input data value to each hidden layer node. At each hidden layer node, the input data value received from each input layer node is multiplied by a respective connection weight, and the resulting products are summed or accumulated into an activation signal value that is provided to the activation function for that node. The output of the activation function is then provided as an input data value to each output layer node. At each output layer node, the output data value received from each hidden layer node is multiplied by a respective connection weight, and the resulting products are summed or accumulated into an activation signal value that is provided to the activation function for that node. The output of the activation function is then provided as output data. Additional hidden layers may be similarly configured to process data.

Training an ANN includes optimizing the connection weights between nodes by minimizing the prediction error of the output data until the ANN achieves a particular level of accuracy. One method is backpropagation, or backward propagation of errors, which iteratively and recursively determines a gradient descent with respect to the connection weights, and then adjusts the connection weights to improve the performance of the network.

A multi-layer perceptron (MLP) is a fully-connected ANN that has an input layer, an output layer and one or more hidden layers, and uses a non-linear activation function to classify data that is not linearly separable. MLPs may be used for natural language processing applications, such as machine translation, speech recognition, etc. A CNN is a variation of an MLP that has an input layer, an output layer and multiple hidden layers, including a series of convolutional layers, followed by pooling layers, fully-connected layers, and normalization layers. Each convolutional layer applies a sliding dot product or cross-correlation to the input data, and then transmits the results to the next layer. CNNs may be used for classification or recognition applications, such as image recognition, speech recognition, etc. Other ANNs include recursive neural networks (RNNs), long short-term memories (LSTMs), sequence-to-sequence models that include an encoder RNN and a decoder RNN, shallow neural networks, etc.

FIG. 1A depicts a convolutional layer calculation for a CNN, in accordance with an embodiment of the present disclosure.

Input feature maps 2 (6×6×3) includes input data matrix 2.1, input data matrix 2.2 and input data matrix 2.3, filter 3 (3×3×3) includes weight matrix 3.1 (w1), weight matrix 3.2 (w2), and weight matrix 3.3 (w3), and output feature map 4 (4×4×1) includes an output data matrix. Filter 3 is convolved with input feature maps 2 to produce output feature map 4.

In this example, the output data matrix element of is the sum of the dot products of filter 3.1 (w1) and the upper left quadrant of input data matrix 2.1 (a1q1), filter 3.2 (w2) and the upper left quadrant of input data matrix 2.2 (a2q1), and filter 3.3 (w3) and the upper left quadrant of input data matrix 2.3 (a3q1).

More particularly, the dot product of filter 3.1 ($w^1$) and the upper left quadrant of input data matrix 2.1 ($a^1_{q1}$) is equal to $a^1_1 \times w^1_1 + a^1_2 \times w^1_2 + a^1_3 \times w^1_3 + a^1_7 \times w^1_4 + a^1_8 \times w^1_5 + a^1_9 \times w^1_6 + a^1_{13} \times w^1_7 + a^1_{14} \times w^1_8 + a^1_{15} \times w^1_9$. The dot products of filter 3.2 ($w^2$) and the upper left quadrant of input data matrix 2.2 ($a^2_{q1}$), and filter 3.3 ($w^3$) and the upper left quadrant of input data matrix 2.3 ($a^3_{q1}$) are calculated in the same manner, i.e., the dot product of filter 3.2 ($w^2$) and the upper left quadrant of input data matrix 2.2 ($a^2_{q1}$) is equal to $a^2_1 \times w^2_1 + a^2_2 \times w^2_2 + a^2_3 \times w^2_3 + a^2_7 \times w^2_4 + a^2_8 \times w^2_5 + a^2_9 \times w^2_6 + a^2_{13} \times w^2_7 + a^2_{14} \times w^2_8 + a^2_{15} \times w^2_9$, and the dot product of filter 3.3 ($w^3$) and the upper left quadrant of input data matrix 2.3 ($a^3_{q1}$) is equal to $a^3_1 \times w^3_1 + a^3_2 \times w^3_2 + a^3_3 \times w^3_3 a^3_7 \times w^3_4 + a^3_8 \times w^3_5 + a^3_9 \times w^3_6 + a^3_{13} \times w^3_7 + a^3_{14} \times w^3_8 + a^3_{15} \times w^3_9$.

Output data matrix element $o_2$ is the sum of the dot products of filter 3.1 ($w^1$) and the next upper quadrant of input data matrix 2.1, filter 3.2 ($w^2$) and the next upper quadrant of input data matrix 2.2, and filter 3.3 ($w^3$) and the next upper quadrant of input data matrix 2.3. The "next" upper quadrant in each input data matrix 2.1, 2.2 and 2.3 has been shifted one column to the right relative to the first upper quadrant. More particularly, the dot product of filter 3.1 ($w^1$) and the next upper quadrant of input data matrix 2.1 is equal to $a^1_2 \times w^1_1 + a^1_3 \times w^1_2 + a^1_4 \times w^1_3 + a^1_8 \times w^1_4 + a^1_9 \times w^1_5 + a^1_{10} \times w^1_6 + a^1_{14} \times w^1_7 + a^1_{15} \times w^1_8 + a^1_{16} \times w^1_9$. The dot products of filter 3.2 ($w^2$) and the next upper quadrant of input data matrix 2.2, and filter 3.3 ($w^3$) and the next upper quadrant of input data matrix 2.3 are calculated in the same manner, i.e., the dot product of filter 3.2 ($w^2$) and the next upper quadrant of input data matrix 2.2 is equal to $a^2_2 \times w^2_1 + a^2_3 \times w^2_2 + a^2_4 \times w^2_3 + a^2_8 \times w^2_4 + a^2_9 \times w^2_5 + a^2_{10} \times w^2_6 + a^2_{14} \times w^2_7 + a^2_{15} \times w^2_8 + a^2_{16} \times w^2_9$, and the dot product of filter 3.3 ($w^3$) and the next upper quadrant of input data matrix 2.3 is equal to $a^3_2 \times w^3_1 + a^3_3 \times w^3_2 + a^3_4 \times w^3_3 + a^3_8 \times w^3_4 + a^3_9 \times w^3_5 + a^3_{10} \times w^3_6 + a^3_{14} \times w^3_7 + a^3_{15} \times w^3_8 + a^3_{16} \times w^3_9$.

Figure 1B:
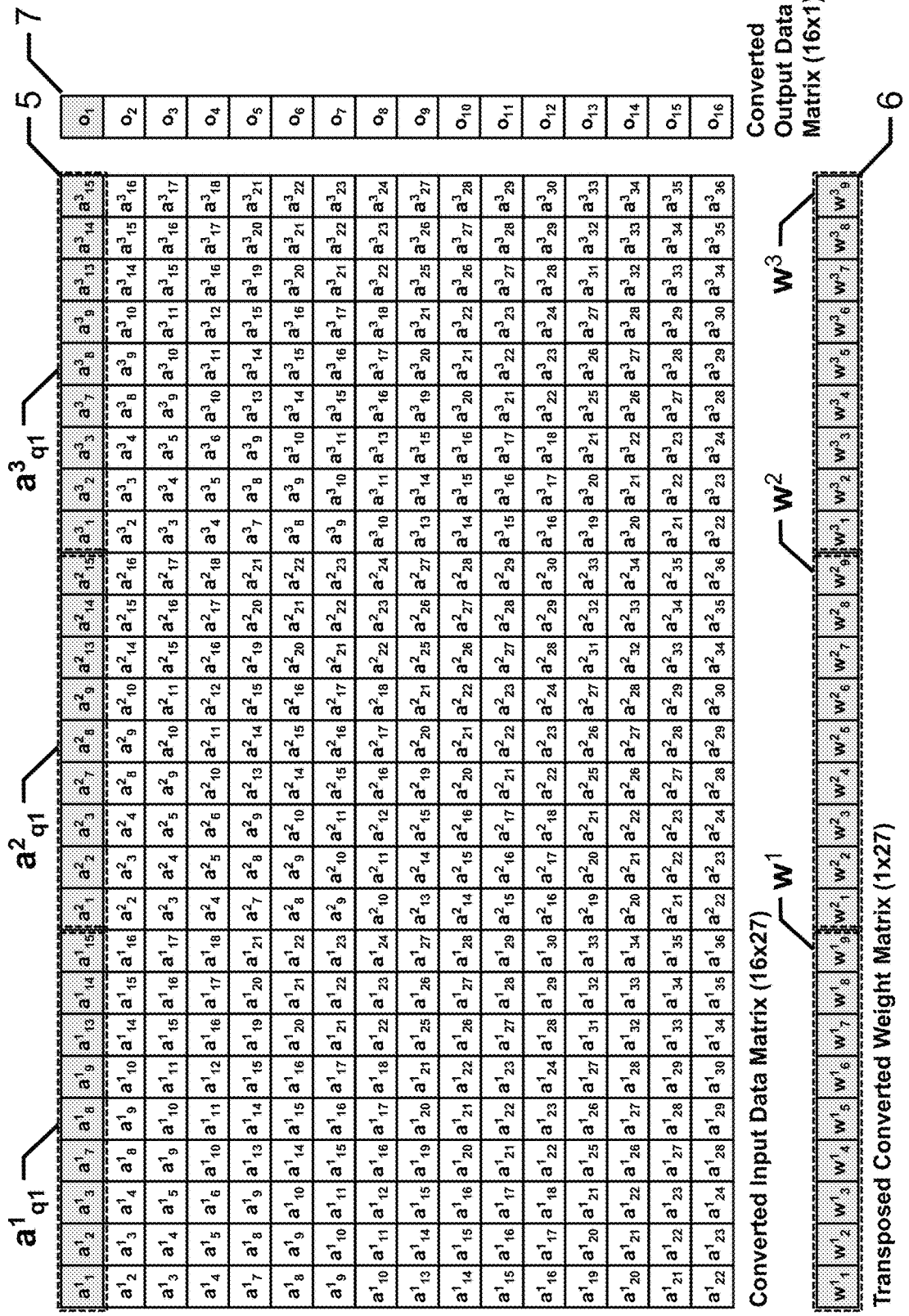
FIG. 1B depicts a converted convolutional layer calculation for a CNN, in accordance with an embodiment of the present disclosure.

FIG. 1B depicts a converted convolutional layer calculation for a CNN, in accordance with an embodiment of the present disclosure.

In one embodiment, the convolutional layer calculations for CNNs executing on central processor units (CPUs), graphics processing units (GPUs), etc., may be converted into generic matrix multiplication (GEMM) operations, which may leverage GEMM-optimized software libraries, or, alternatively, which may be implemented in a dedicated hardware accelerator using a two-dimensional array of MAC units.

Convolution layer calculation 1 is converted into a GEMM operation by converting input feature maps 2 into converted input data matrix 5 (16×27) and filter 3 into converted weight matrix 6 (27×1). After multiplying converted input data matrix 5 and converted weight matrix 6, converted output data matrix 7 (16×1) is then reformed into output feature map 4 (4×4). For ease of illustration, converted weight matrix 6 (27×1) is depicted in a transposed orientation (1×27) in FIG. 1B.

In this example, converted output data matrix element $o_1$ is the sum of the dot products of the first row of converted input data matrix 5 and the first (i.e., only) column of converted weight matrix 6. As shown in FIG. 1B, the first row of converted input data matrix 5 includes the elements of the upper left quadrant of input data matrix 2.1 ($a^1_{q1}$), the upper left quadrant of input data matrix 2.2 ($a^2_{q1}$), and the upper left quadrant of input data matrix 2.3 ($a^3_{q1}$), while the converted weight matrix 6 includes filter 3.1 ($w^1$), filter 3.2 ($w^2$), and filter 3.3 ($w^3$).

More particularly, the converted output data matrix element $o_1$ is equal to $a^1_1 \times w^1_1 + a^1_2 \times w^1_2 + a^1_3 \times w^1_3 + a^1_7 \times w^1_4 + a^1_8 \times w^1_5 + a^1_9 \times w^1_6 + a^1_{13} \times w^1_7 + a^1_{14} \times w^1_8 + a^1_{15} \times w^1_9 \times a^2_1 \times w^2_1 + a^2_2 \times w^2_2 + a^2_3 \times w^2_3 + a^2_7 \times w^2_4 + a^2_8 \times w^2_5 + a^2_9 \times w^2_6 + a^2_{13} \times w^2_7 + a^2_{14} \times w^2_8 + a^2_{15} \times w^2_9 + a^3_1 \times w^3_1 + a^3_2 \times w^3_2 + a^3_3 \times w^3_3 + a^3_7 \times w^3_4 + a^3_8 \times w^3_5 + a^3_9 \times w^3_6 + a^3_{13} \times w^3_7 + a^3_{14} \times w^3_8 + a^3_{15} \times w^3_9$. As shown above, the converted output data matrix element $o_1$ is equal to the output data matrix element $o_1$.

Unfortunately, for CNNs executing on CPUs, GPUs or other coprocessors or hardware accelerators, GEMM operations consume a significant number of processor cycles due to the large number of multiplications that are required. For example, one known image recognition CNN requires 3 giga operations per second (GOPS) per input data frame.

Figure 2A:
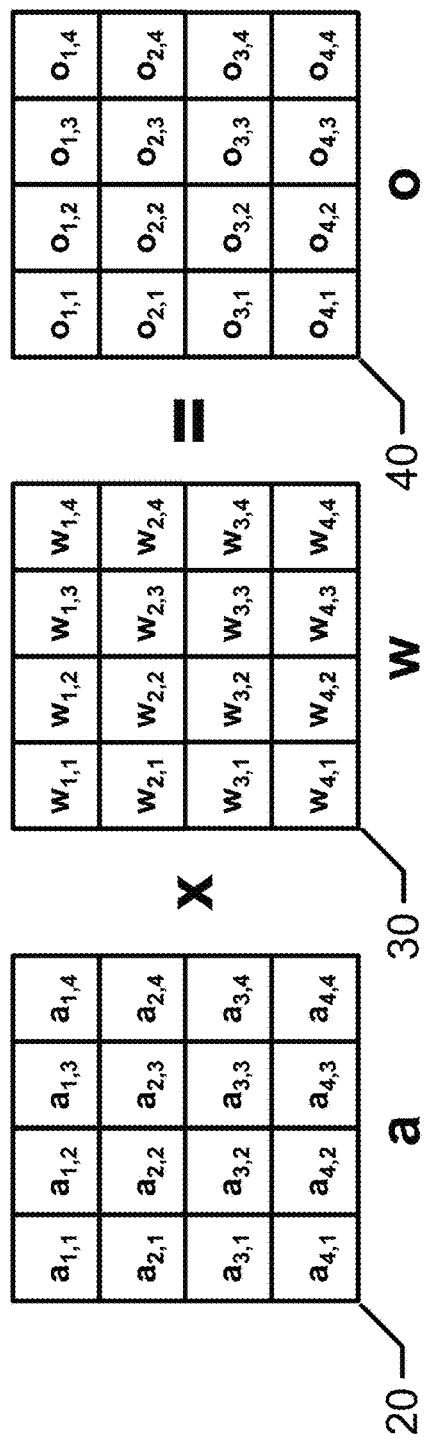
FIGS. 2A and 2B depict multiplication of two matrices to generate an output matrix, in accordance with an embodiment of the present disclosure.
Figure 2B:
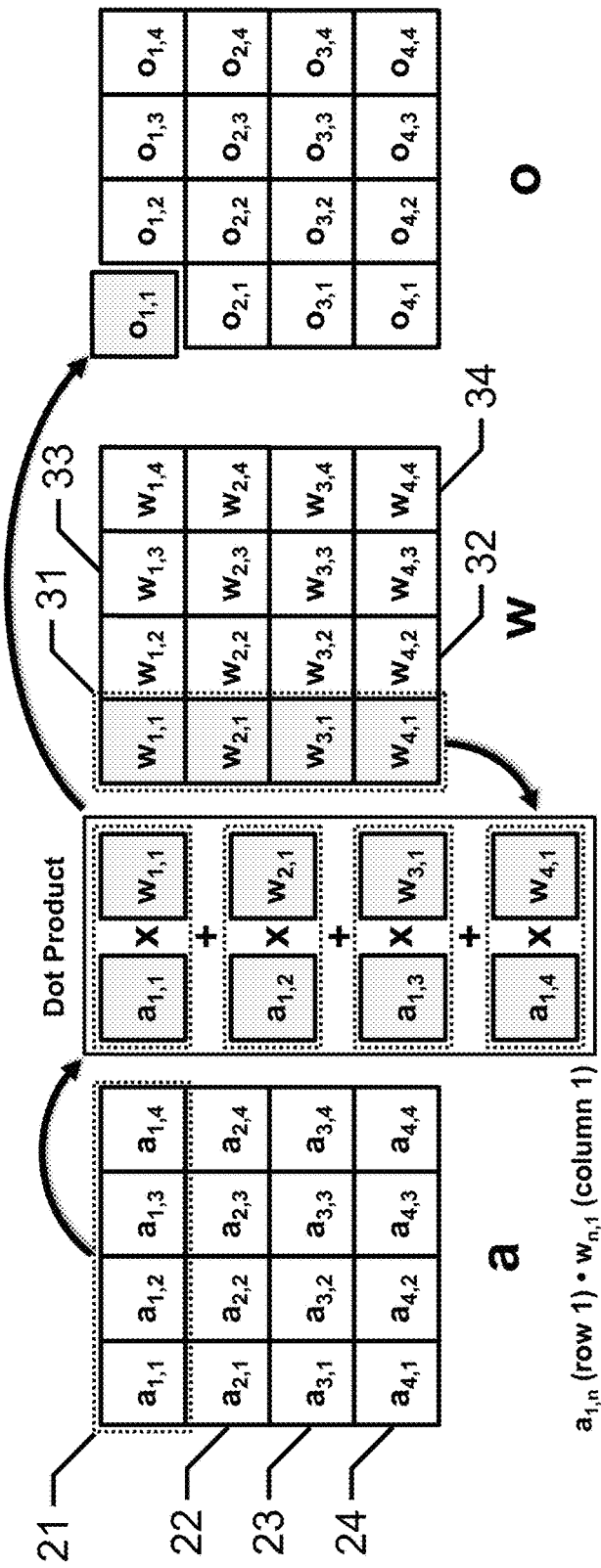

FIGS. 2A and 2B depict multiplication of two matrices to generate an output matrix, in accordance with an embodiment of the present disclosure.

In this embodiment, matrix 20 (4×4), labeled "a," is multiplied with matrix 30 (4×4), labeled "w," to produce matrix 40 (4×4), labeled "o." With respect to FIG. 1B, matrix 20 may represent a version of a converted input data matrix, matrix 30 may represent a version of a converted weight matrix, and matrix 40 may represent a version of a converted output data matrix. The elements of matrix 20 are labeled $a_{i,j}$, the elements of matrix 30 are labeled $w_{i,j}$, and the elements of matrix 40 are labeled $o_{i,j}$, where i and j go from 1 to 4.

To multiply matrix 20 and matrix 30, a dot product is calculated for each matrix 20 row and matrix 30 column pair. Matrix 20 includes rows 21, 22, 23 and 24, and matrix 30 includes columns 31, 32, 33 and 34. Generally, for each element $o_{i,j}$ of matrix 40, a dot product of the $i^{th}$ row of matrix 20 and the $j^{th}$ column of matrix 30 is calculated by multiplying each element $a_{i,n}$ of the $i^{th}$ row of matrix 20 with a corresponding element $w_{n,j}$ of the $j^{th}$ column of matrix 30 to generate an intermediate product, and accumulating the intermediate products into element $o_{i,j}$ of matrix 40. FIG. 2B illustrates this process for element $o_{1,1}$ of matrix 40. The dot product for this element is calculated using row 21 of matrix 20 and column 31 of matrix 30, i.e., $o_{1,1}$ is equal to $a_{1,1} \times w_{1,2} + a_{1,2} \times w_{2,1} + a_{1,3} \times w_{3,1} + a_{1,4} \times w_{4,1}$.

Figure 3:
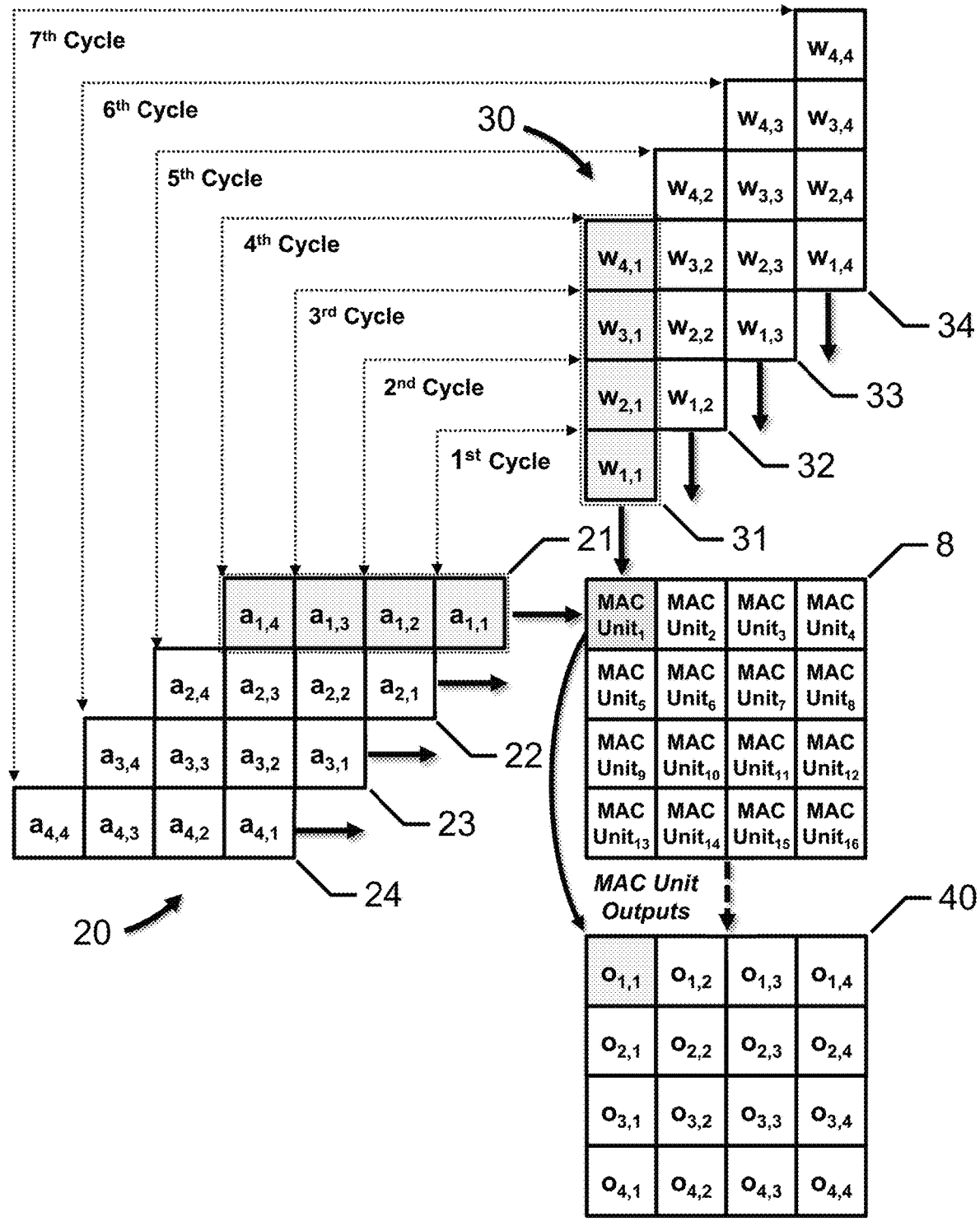
FIG. 3 depicts a data flow diagram for a MAC array, in accordance with an embodiment of the present disclosure.

FIG. 3 depicts a data flow diagram for a MAC array, in accordance with an embodiment of the present disclosure.

As noted above, GEMM operations may be implemented in a dedicated hardware accelerator using a two-dimensional array of MAC units. Elements from matrix 20 enter MAC array 8 from the left edge, and elements from matrix 30 enter MAC array 8 from the top edge. The orientation of matrices 20 and 30 relative to MAC array 8 simplifies illustration; other orientations are also contemplated. Each MAC unit calculates a dot product, between a row of matrix 20 and a column of matrix 30, for an element of matrix 40.

For example, the MAC unit located in the first row and the first column of MAC array 8, i.e., MAC Unit$_1$, calculates the dot product of the first row of matrix 20, i.e., row 21, and the first column of matrix 30, i.e., column 31, to generate the element for the first row and the first column of matrix 40, i.e., $o_{1,1}$. MAC Unite calculates the dot product of row 21 of matrix 20 and column 32 of matrix 30 to generate element $o_{1,2}$ of matrix 40, MAC Unita calculates the dot product of row 21 of matrix 20 and column 33 of matrix 30 to generate element $o_{1,3}$ of matrix 40, and MAC Unita calculates the dot product of row 21 of matrix 20 and column 34 of matrix 30 to generate element $o_{1,4}$ of matrix 40. Generally, MAC Unit$_5$ through MAC Unita calculate the dot products for elements $o_{2,1}$ through $o_{2,4}$ of matrix 40 based on row 22 of matrix 20 and columns 31 to 34 of matrix 30, respectively. MAC Unit$_9$ through MAC Unit$_{12}$ calculate the dot products for elements $o_{3,1}$ through $o_{3,4}$ of matrix 40 based on row 23 of matrix 20 and columns 31 to 34 of matrix 30, respectively. MAC Unit$_{13}$ through MAC Unit$_{16}$ calculate the dot products for elements $o_{4,1}$ through $o_{4,4}$ of matrix 40 based on row 24 of matrix 20 and columns 31 to 34 of matrix 30, respectively.

The first row of MAC units receives row 21 from matrix 20, i.e., MAC Unit$_1$ to MAC Unit$_4$, the second row of MAC units receives row 22 from matrix 20, i.e., MAC Unit$_5$ to MAC Unit$_8$, the third row of MAC units receives row 23 from matrix 20, i.e., MAC Unit$_9$ to MAC Unit$_{12}$, and the fourth row of MAC units receives row 24 from matrix 20, i.e., MAC Unit$_{13}$ to MAC Unit$_{16}$. The first column of MAC units receives column 31 from matrix 30, i.e., MAC Unit$_1$, MAC Unit$_5$, MAC Unit$_9$ and MAC Unit$_{13}$, the second column of MAC units receives column 32 from matrix 30, i.e., MAC Unite, MAC Unit$_6$, MAC Unit$_{10}$ and MAC Unit$_{14}$, the third column of MAC units receives column 33 from matrix 30, i.e., MAC Unit$_3$, MAC Unit$_7$, MAC Unit$_{11}$ and MAC Unit$_{15}$, and the fourth column of MAC units receives column 34 from matrix 30, i.e., MAC Unit$_4$, MAC Unit$_8$, MAC Unit$_{12}$ and MAC Unit$_{16}$.

Figure 4:
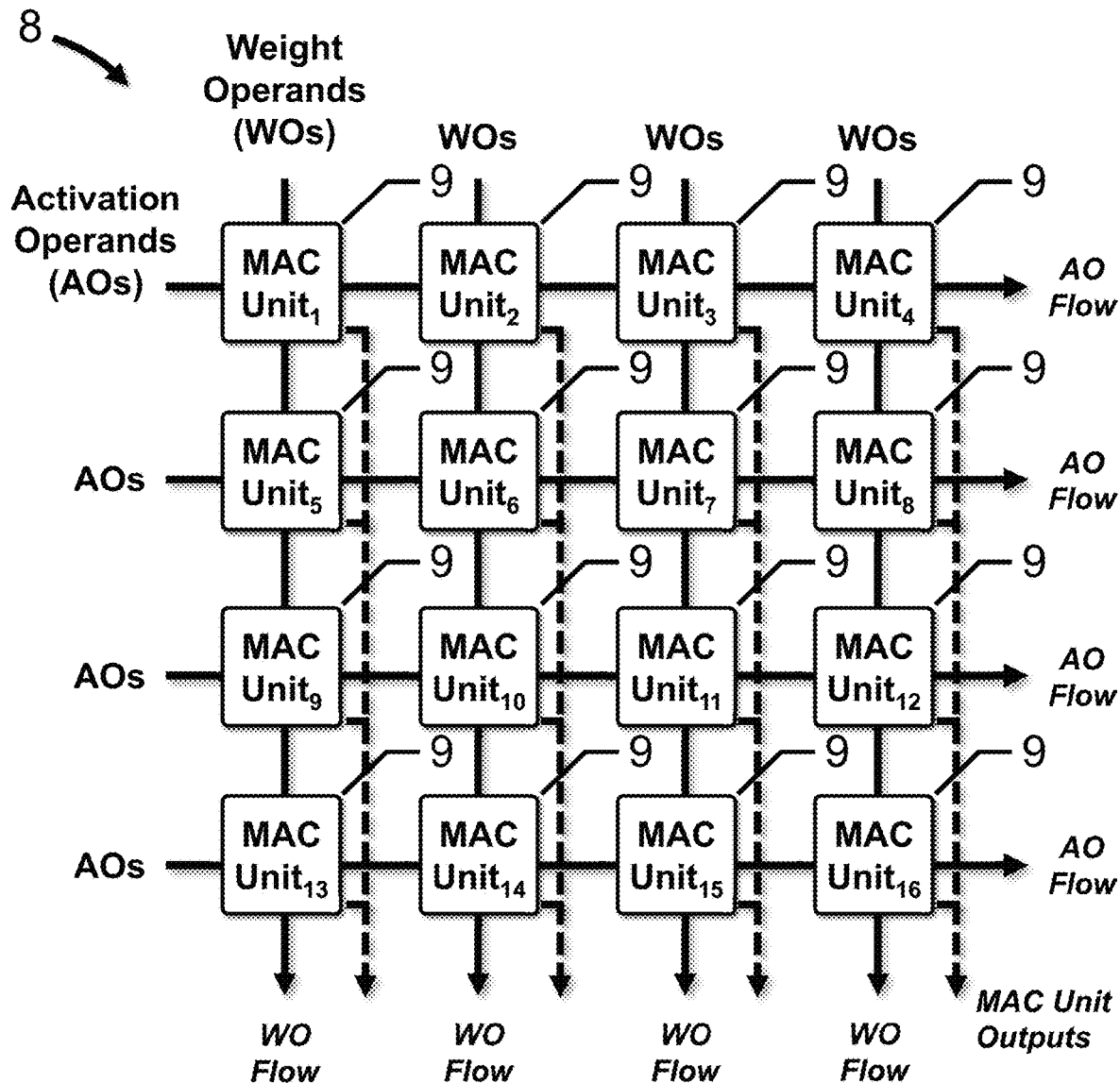
FIG. 4 depicts a MAC array, in accordance with an embodiment of the present disclosure.

FIG. 4 depicts a MAC array, in accordance with an embodiment of the present disclosure.

In this embodiment, MAC array 8 is a two-dimensional (4×4), systolic array of "output stationary" MAC units 9 that multiply matrix 20 and matrix 30 to generate matrix 40. As noted above, each MAC unit 9 calculates a dot product, between a row of matrix 20 and a column of matrix 30, for an element of matrix 40.

In this embodiment, the elements of matrix 20 are labeled as activation operands, or AOs, and the elements of matrix 30 are labeled as weight operands, or WOs. The direction of AO flow through MAC units 9 of MAC array 8 is from left to right, and the direction of WO flow through MAC units 9 of MAC array 8 is from top to bottom. In other words, each MAC unit 9 receives AOs from the MAC unit 9 to its left and transmits AOs to the MAC unit 9 to its right, receives WOs from the MAC unit 9 located above and transmits WOs to the MAC unit 9 located below, and outputs the value of its dot product. The first column of MAC units 9, i.e., MAC Unit$_1$, MAC Unit$_5$, MAC Unit$_9$ and MAC Unit$_{13}$, receives AOs from an AO register (not shown for clarity), while the first row of MAC units 9, i.e., MAC Unit$_1$ to MAC Unita, receives WOs from a WO register (not shown for clarity).

Figure 5:
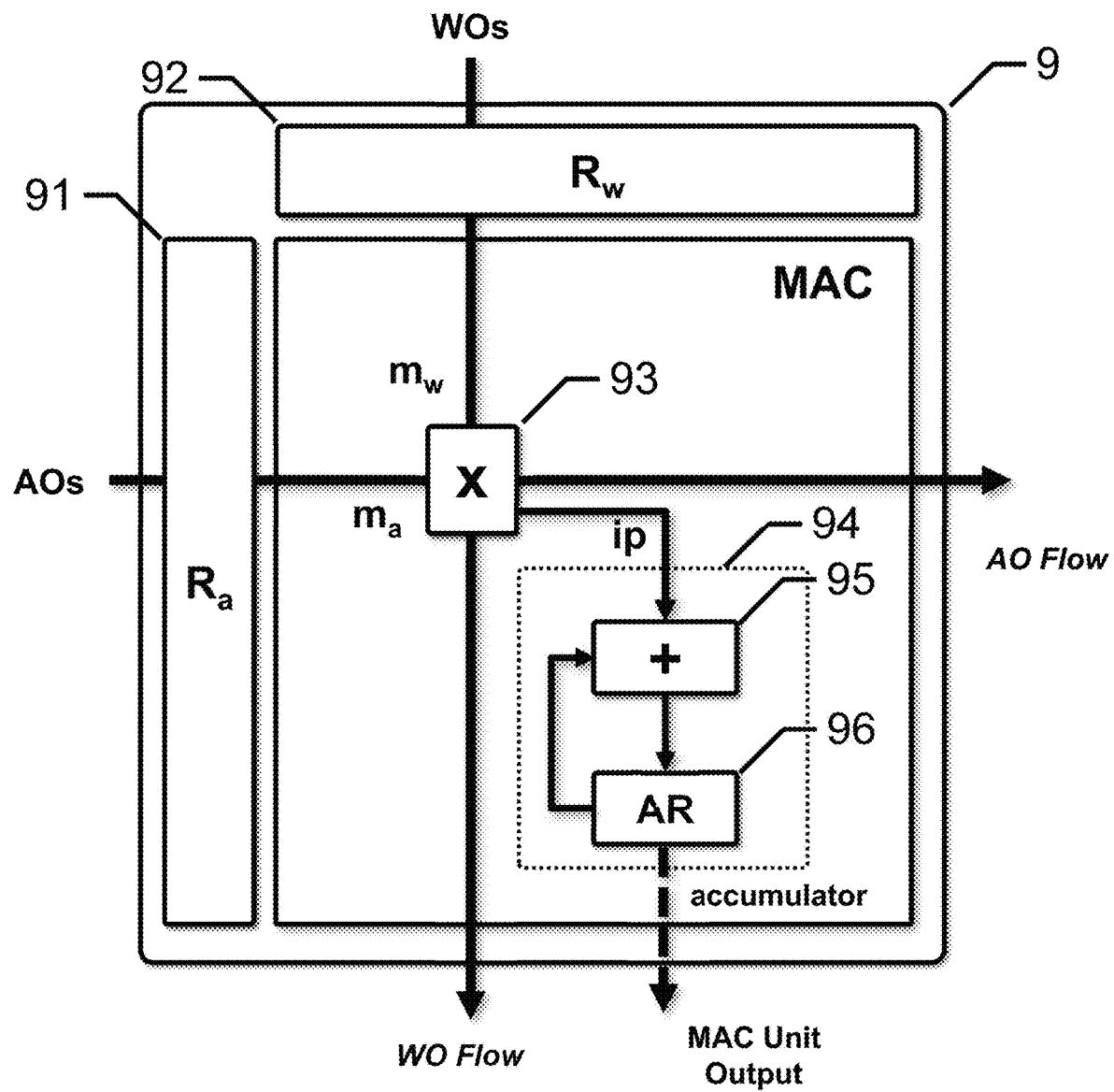
FIG. 5 depicts a MAC unit, in accordance with an embodiment of the present disclosure.

FIG. 5 depicts a MAC unit, in accordance with an embodiment of the present disclosure.

MAC unit 9 includes register 91, register 92, multiplier circuit 93 coupled to registers 91 and 92, and accumulator circuit 94 coupled to multiplier circuit 93. Register 91 receives, stores and transmits each AO, and register 92 receives, stores and transmits each WO. Multiplier circuit 93 multiplies the data value, $m_a$, provided by register 91 and the data value, $m_w$, provided by register 92, and outputs the resulting data value or intermediate product, ip, to accumulator circuit 94.

Accumulator circuit 94 includes adder circuit 95 and accumulator register 96. Adder circuit 95 adds the intermediate product from multiplier circuit 93 with the current data value stored in accumulator register 96, and outputs the resulting data value to accumulator register 96. At the end of each dot product calculation cycle, described in more detail below, accumulator register 96 outputs a final accumulated data value. In other words, accumulator circuit 94 receives the respective intermediate products from multiplier circuit 93, and accumulates the respective intermediate products into a value for one element of matrix 40. In alternative embodiments, accumulator register 96 simply outputs the current data value each time a new data value is received from adder circuit 95.

Referring back to FIG. 3, the elements from matrices 20 and 30 enter MAC array 8 in a staggered fashion over several calculation cycles in order to properly align the elements as they flow through MAC array 8.

Generally, when the leading element of a row from matrix 20 and a leading element of a corresponding column from matrix 30 reach a MAC unit 9 of MAC array 8, MAC unit 9 multiplies the operands together and stores the resulting intermediate product to accumulator register 96. When the next element of the row from matrix 20 and the next element of the corresponding column from matrix 30 reach MAC unit 9, the operands are multiplied together and the resulting intermediate product is added to the value previously stored in accumulator register 96. This process repeats for the third and fourth element pairs. After the fourth element pair has been multiplied together and the intermediate product accumulated in accumulator register 96, MAC unit 9 outputs the value from accumulator register 96 to matrix 40. After the value of accumulator register 96 is output, MAC unit 9 is ready to begin the next matrix multiplication operation, which includes resetting accumulator register 96 to zero.

The multiplication of matrices 20 and 30 begins with the $1^{st}$ cycle, which includes MAC Unit$_1$. In certain embodiments, the remaining MAC units 9 may be performing calculations for two matrices that were previously provided to MAC array 8. In other words, data may be provided to MAC array 8 in a pipeline in order to increase the efficiency of the calculations.

With respect to MAC Unit$_1$, element $a_{1,1}$ from row 21 of matrix 20 is transmitted from the AO register (not shown for clarity) to register 91, element $w_{1,1}$ from column 31 of matrix 30 is transmitted from the WO register (not shown for clarity) to register 92, multiplier circuit 93 multiplies element $a_{1,1}$ and element $w_{1,1}$, and accumulator circuit 94 accumulates and stores the result into accumulator register 96.

The $2^{nd}$ cycle includes MAC Unit$_1$, MAC Unit$_2$, and MAC Unit$_5$.

With respect to MAC Unit$_1$, register 91 transmits element $a_{1,1}$, to MAC Unit$_2$ and register 92 transmits element $w_{1,1}$ to MAC Unit$_5$. Element $a_{1,2}$ from row 21 of matrix 20 is transmitted from the AO register to register 91, element $w_{2,1}$ from column 31 of matrix 30 is transmitted from the WO register to register 92, multiplier circuit 93 multiplies element $a_{1,2}$ and element $w_{2,1}$, and accumulator circuit 94 accumulates and stores the result into accumulator register 96.

With respect to MAC Unit$_2$, register 91 receives element $a_{1,1}$ from MAC Unit$_1$, register 92 receives element $w_{1,2}$ from the WO register, multiplier circuit 93 multiplies element $a_{1,1}$ and element $w_{1,2}$, and accumulator circuit 94 accumulates and stores the result into accumulator register 96.

With respect to MAC Unit$_5$, register 91 receives element $a_{2,1}$ from the AO register, register 92 receives element $w_{1,1}$ from MAC Unit$_1$, multiplier circuit 93 multiplies element $a_{2,1}$ and element $w_{1,1}$, and accumulator circuit 94 accumulates and stores the result into accumulator register 96.

The $3^{rd}$ cycle includes MAC Unit$_1$, MAC Unit$_2$, MAC Unit$_3$, MAC Unit$_5$, MAC Unit$_6$, and MAC Unit$_9$.

With respect to MAC Unit$_1$, register 91 transmits element $a_{1,2}$, to MAC Unit$_2$, and register 92 transmits element $w_{2,1}$ to MAC Unit$_5$. Element $a_{1,3}$ from row 21 of matrix 20 is transmitted from the AO register to register 91, element $w_{3,1}$ from column 31 of matrix 30 is transmitted from the WO register to register 92, multiplier circuit 93 multiplies element $a_{1,3}$ and element $w_{3,1}$, and accumulator circuit 94 accumulates and stores the result into accumulator register 96.

With respect to MAC Unit$_2$, register 91 transmits element $a_{1,1}$, to MAC Unit$_3$, and register 92 transmits element $w_{1,2}$ to MAC Unit$_6$. Register 91 receives element $a_{1,2}$ from MAC Unit$_1$, register 92 receives element $w_{2,2}$ from the WO register, multiplier circuit 93 multiplies element $a_{1,2}$ and element $w_{2,2}$, and accumulator circuit 94 accumulates and stores the result into accumulator register 96.

With respect to MAC Unit$_3$, register 91 of receives element $a_{1,1}$ from MAC Unit$_2$, register 92 receives element $w_{1,3}$ from the WO register, multiplier circuit 93 multiplies element $a_{1,1}$ and element $w_{1,3}$, and accumulator circuit 94 accumulates and stores the result into accumulator register 96.

With respect to MAC Unit$_5$, register 91 transmits element $a_{2,1}$, to MAC Unit$_6$, and register 92 transmits element $w_{1,1}$ to MAC Unit$_9$. Register 91 receives element $a_{2,2}$ from the AO register, register 92 receives element $w_{2,1}$ from MAC Unit$_1$, multiplier circuit 93 multiplies element $a_{2,2}$ and element $w_{2,1}$, and accumulator circuit 94 accumulates and stores the result into accumulator register 96.

With respect to MAC Unit$_6$, register 91 of receives element $a_{2,1}$ from MAC Unit$_5$, register 92 receives element $w_{1,2}$ from MAC Unit$_2$, multiplier circuit 93 multiplies element $a_{2,1}$ and element $w_{1,2}$, and accumulator circuit 94 accumulates and stores the result into accumulator register 96.

With respect to MAC Unit$_9$, register 91 of receives element $a_{3,1}$ from the AO register, register 92 receives element $w_{1,1}$ from MAC Unit$_5$, multiplier circuit 93 multiplies element $a_{3,1}$ and element $w_{1,1}$, and accumulator circuit 94 accumulates and stores the result into accumulator register 96.

The $4^{th}$ cycle includes MAC Unit$_1$, MAC Unit$_2$, MAC Unit$_3$, MAC Unit$_4$, MAC Unit$_5$, MAC Unit$_6$, MAC Unit$_7$, MAC Unit$_9$, MAC Unit$_{10}$, and MAC Unit$_{13}$.

With respect to MAC Unit$_1$, register 91 transmits element $a_{1,3}$, to MAC Unit$_2$, and register 92 transmits element $w_{3,1}$ to MAC Unit$_5$. Element $a_{1,4}$ from row 21 of matrix 20 is transmitted from the AO register to register 91, element $w_{4,1}$ from column 31 of matrix 30 is transmitted from the WO register to register 92, multiplier circuit 93 multiplies element $a_{1,4}$ and element $w_{4,1}$, and accumulator circuit 94 accumulates and stores the result into accumulator register 96. The value stored in accumulator register 26 is then output as element $o_{1,1}$ of matrix 40. In certain embodiments, MAC Unit$_1$ is ready to begin the next calculation cycle for the next pair of matrices.

With respect to MAC Unit$_2$, register 91 transmits element $a_{1,2}$, to MAC Unit$_3$, and register 92 transmits element $w_{2,2}$ to MAC Unit$_6$. Register 91 receives element $a_{1,3}$ from MAC Unit$_1$, register 92 receives element $w_{3,2}$ from the WO register, multiplier circuit 93 multiplies element $a_{1,3}$ and element $w_{3,2}$, and accumulator circuit 94 accumulates and stores the result into accumulator register 96.

With respect to MAC Unit$_3$, register 91 transmits element $a_{1,1}$, to MAC Unit$_4$, and register 92 transmits element $w_{1,3}$ to MAC Unit$_7$. Register 91 receives element $a_{1,2}$ from MAC Unit$_2$, register 92 receives element $w_{2,3}$ from the WO register, multiplier circuit 93 multiplies element $a_{1,2}$ and element $w_{2,3}$, and accumulator circuit 94 accumulates and stores the result into accumulator register 96.

With respect to MAC Unit$_4$, register 91 receives element $a_{1,1}$ from MAC Unit$_3$, register 92 receives element $w_{1,4}$ from the WO register, multiplier circuit 93 multiplies element $a_{1,1}$ and element $w_{1,4}$, and accumulator circuit 94 accumulates and stores the result into accumulator register 96.

With respect to MAC Unit$_5$, register 91 transmits element $a_{2,2}$, to MAC Unit$_6$, and register 92 transmits element $w_{2,1}$ to MAC Unit$_9$. Register 91 receives element $a_{2,3}$ from the AO register, register 92 of MAC Unit$_5$ receives element $w_{3,1}$ from MAC Unit$_1$, multiplier circuit 93 of MAC Unit$_5$ multiplies element $a_{2,3}$ and element $w_{3,1}$, and accumulator circuit 94 accumulates and stores the result into accumulator register 96.

With respect to MAC Unit$_6$, register 91 transmits element $a_{2,1}$, to MAC Unit$_7$ and transmits element $w_{1,2}$ to MAC Unit$_{10}$. Register 91 receives element $a_{2,2}$ from MAC Unit$_5$, register 92 receives element $w_{2,2}$ from MAC Unit$_2$, multiplier circuit 93 multiplies element $a_{2,2}$ and element $w_{2,2}$, and accumulator circuit 94 accumulates and stores the result into accumulator register 96.

With respect to MAC Unit$_7$, register 91 receives element $a_{2,1}$ from MAC Unit$_6$, register 92 receives element $w_{1,3}$ from MAC Unit$_3$, multiplier circuit 93 multiplies element $a_{2,1}$ and element $w_{1,3}$, and accumulator circuit 94 accumulates and stores the result into accumulator register 96.

With respect to MAC Unit$_9$, register 91 transmits element $a_{3,1}$, to MAC Unit$_{10}$, and register 92 transmits element $w_{1,1}$ to MAC Unit$_{13}$. Register 91 receives element $a_{3,2}$ from the AO register, register 92 receives element $w_{2,1}$ from MAC Unit$_5$, multiplier circuit 93 multiplies element $a_{3,2}$ and element $w_{2,1}$, and accumulator circuit 94 accumulates and stores the result into accumulator register 96.

With respect to MAC Unit$_{10}$, register 91 of receives element $a_{3,1}$ from MAC Unit$_9$, register 92 of MAC Unit$_{10}$ receives element $w_{1,2}$ from MAC Unit$_6$, multiplier circuit 93 multiplies element $a_{3,1}$ and element $w_{1,2}$, and accumulator circuit 94 accumulates and stores the result into accumulator register 96.

With respect to MAC Unit$_{13}$, register 91 receives element $a_{4,1}$ from the AO register, register 92 receives element $w_{1,1}$ from MAC Unit$_9$, multiplier circuit 93 multiplies element $a_{4,1}$ and element $w_{1,1}$, and accumulator circuit 94 accumulates and stores the result into accumulator register 96.

The 5$^{th}$ cycle, 6$^{th}$ cycle and 7$^{th}$ cycle are also depicted in FIG. 3; the 8$^{th}$ cycle, the 9$^{th}$ cycle and the 10$^{th}$ cycle are not shown for clarity. The processes for the 5$^{th}$ cycle through the 10$^{th}$ cycle continue the pattern discussed above.

At the end of the 5$^{th}$ cycle, MAC Unit$_2$ outputs element $o_{1,2}$ of matrix 40, and MAC Unit$_5$ outputs element $o_{2,1}$ of matrix 40. In certain embodiments, MAC Unit$_2$ and MAC Unit$_5$ are ready to begin the next calculation cycle for the next pair of matrices. At the end of the 6$^{th}$ cycle, MAC Unit$_3$ outputs element $o_{1,3}$ of matrix 40, MAC Unit$_6$ outputs element $o_{2,2}$ of matrix 40, and MAC Unit$_9$ outputs element $o_{3,1}$ of matrix 40. In certain embodiments, MAC Unit$_3$, MAC Unit$_6$ and MAC Unit$_9$ are ready to begin the next calculation cycle for the next pair of matrices. At the end of the 7$^{th}$ cycle, MAC Unit$_4$ outputs element $o_{1,4}$ of matrix 40, MAC Unit$_7$ outputs element $o_{2,3}$ of matrix 40, MAC Unit$_{10}$ outputs element $o_{3,2}$ of matrix 40, and MAC Unit$_{13}$ outputs element $o_{4,1}$ of matrix 40. In certain embodiments, MAC Unit$_4$, MAC Unit$_7$, MAC Unit$_{10}$ and MAC Unit$_{13}$ are ready to begin the next calculation cycle for the next pair of matrices. At the end of the 8$^{th}$ cycle, MAC Unit$_8$ outputs element $o_{2,4}$ of matrix 40, MAC Unit$_{11}$ outputs element $o_{3,3}$ of matrix 40, and MAC Unit$_{14}$ outputs element $o_{4,2}$ of matrix 40. In certain embodiments, MAC Unit$_8$, MAC Unit$_{11}$ and MAC Unit$_{14}$ are ready to begin the next calculation cycle for the next pair of matrices. At the end of the 9$^{th}$ cycle, MAC Unit$_{12}$ outputs element $o_{3,4}$ of matrix 40, and MAC Unit$_{15}$ outputs element $o_{4,3}$ of matrix 40. At the end of the 10$^{th}$ cycle, MAC Unit$_{16}$ outputs the final element $o_{4,4}$ of matrix 40. In certain embodiments, MAC Unit$_{16}$ is ready to begin the next calculation cycle for the next pair of matrices.

Unfortunately, MAC units 9 are an inefficient solution to CNN-related matrix multiplication tasks due to the large number registers in each MAC array 8, i.e., two registers 91, 92 in each MAC unit 9, resulting in significant power consumption, as well as for other reasons, such as, for example, shallow data path, processing latency, hardware costs, etc.

Figure 6:
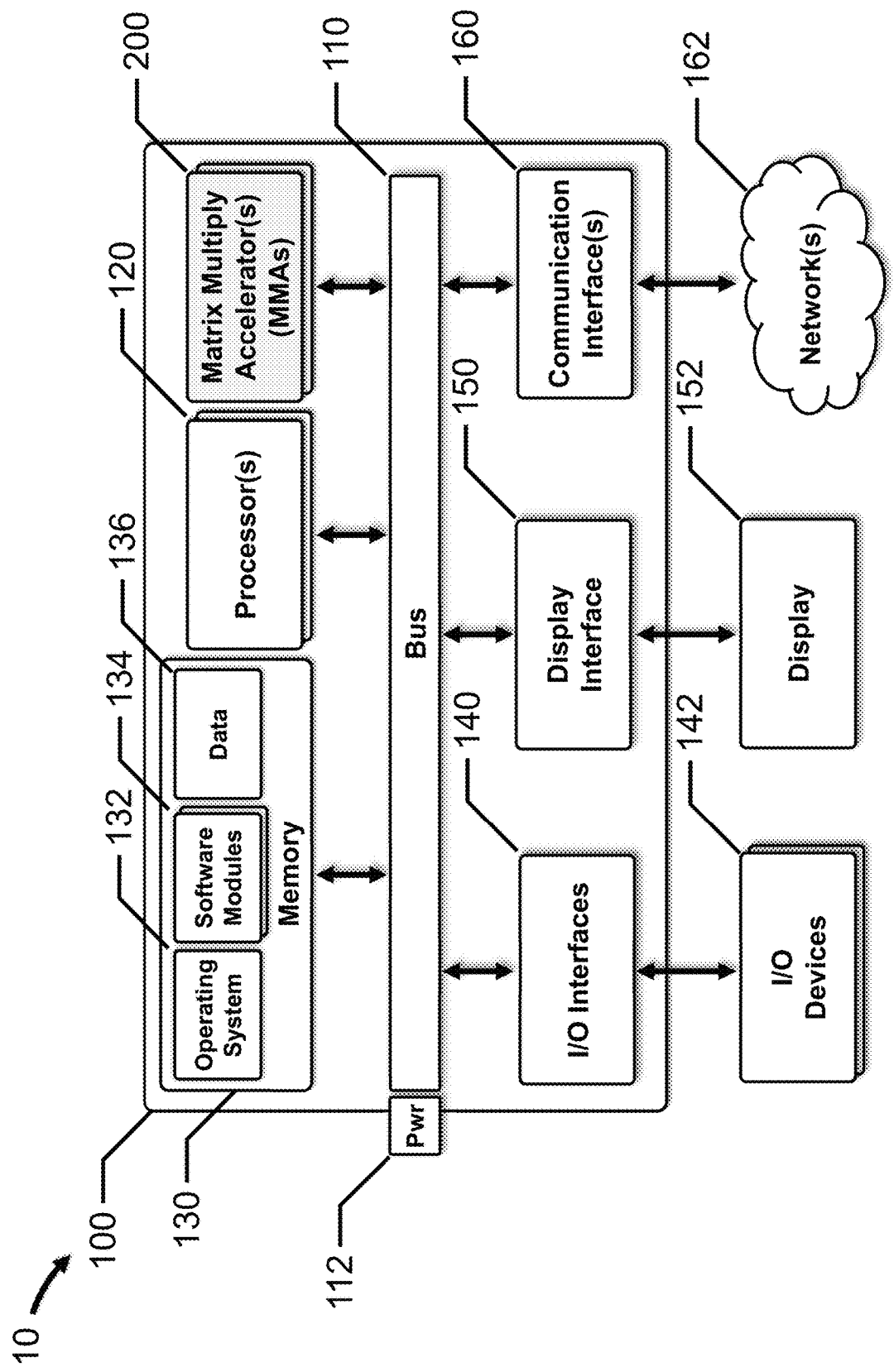
FIG. 6 depicts a block diagram of system, in accordance with an embodiment of the present disclosure.

FIG. 6 depicts a block diagram of system, in accordance with an embodiment of the present disclosure.

Computer 100 includes bus 110 coupled to one or more processors 120, memory 130, I/O interfaces 140, display interface 150, one or more communication interfaces 160 and one or more MMAs 200. Generally, I/O interfaces 140 are coupled to I/O devices 142 using a wired or wireless connection, display interface 150 is coupled to display 152, and communication interface 160 is connected to network 162 using a wired or wireless connection.

Bus 110 is a communication system that transfers data between processor 120, memory 130, I/O interfaces 140, display interface 150, communication interface 160, MMA 200, as well as other components not depicted in FIG. 1. Power connector 112 is coupled to bus 110 and a power supply (not shown).

Processor 120 includes one or more general-purpose or application-specific microprocessors that executes instructions to perform control, computation, input/output, etc. functions for computer 100. Processor 120 may include a single integrated circuit, such as a micro-processing device, or multiple integrated circuit devices and/or circuit boards working in cooperation to accomplish the functions of processor 120. In addition, processor 120 may execute computer programs or modules, such as operating system 132, software modules 134, etc., stored within memory 130. For example, software modules 134 may include an ML application, an ANN application, a CNN application, etc.

Generally, storage element or memory 130 stores instructions for execution by processor 120 and data. Memory 130 may include a variety of non-transitory computer-readable medium that may be accessed by processor 120. In various embodiments, memory 130 may include volatile and nonvolatile medium, non-removable medium and/or removable medium. For example, memory 130 may include any combination of random access memory (RAM), dynamic RAM (DRAM), static RAM (SRAM), read only memory (ROM), flash memory, cache memory, and/or any other type of non-transitory computer-readable medium.

Memory 130 contains various components for retrieving, presenting, modifying, and storing data. For example, memory 130 stores software modules that provide functionality when executed by processor 120. The software modules include operating system 132 that provides operating system functionality for computer 100. Software modules 134 provide various functionality, such as image classification using convolutional neural networks, etc. Data 136 may include data associated with operating system 132, software modules 134, etc.

I/O interfaces 140 are configured to transmit and/or receive data from I/O devices 142. I/O interfaces 140 enable connectivity between processor 120 and I/O devices 142 by encoding data to be sent from processor 120 to I/O devices 142, and decoding data received from I/O devices 142 for processor 120. Generally, data may be sent over wired and/or wireless connections. For example, I/O interfaces 140 may include one or more wired communications interfaces, such as USB, Ethernet, etc., and/or one or more wireless communications interfaces, coupled to one or more antennas, such as WiFi, Bluetooth, cellular, etc.

Generally, I/O devices 142 provide input to computer 100 and/or output from computer 100. As discussed above, I/O devices 142 are operably connected to computer 100 using a wired and/or wireless connection. I/O devices 142 may include a local processor coupled to a communication interface that is configured to communicate with computer 100 using the wired and/or wireless connection. For example, I/O devices 142 may include a keyboard, mouse, touch pad, joystick, etc.

Display interface 150 is configured to transmit image data from computer 100 to monitor or display 152.

Communication interface 160 is configured to transmit data to and from network 162 using one or more wired and/or wireless connections. Network 162 may include one or more local area networks, wide area networks, the Internet, etc., which may execute various network protocols, such as, for example, wired and/or wireless Ethernet, Bluetooth, etc. Network 162 may also include various combinations of wired and/or wireless physical layers, such as, for example, copper wire or coaxial cable networks, fiber optic networks, Bluetooth wireless networks, WiFi wireless networks, CDMA, FDMA and TDMA cellular wireless networks, etc.

MMA 200 is configured to multiply matrices and generate output matrices to support various applications implemented by software modules 134.

Figure 7:
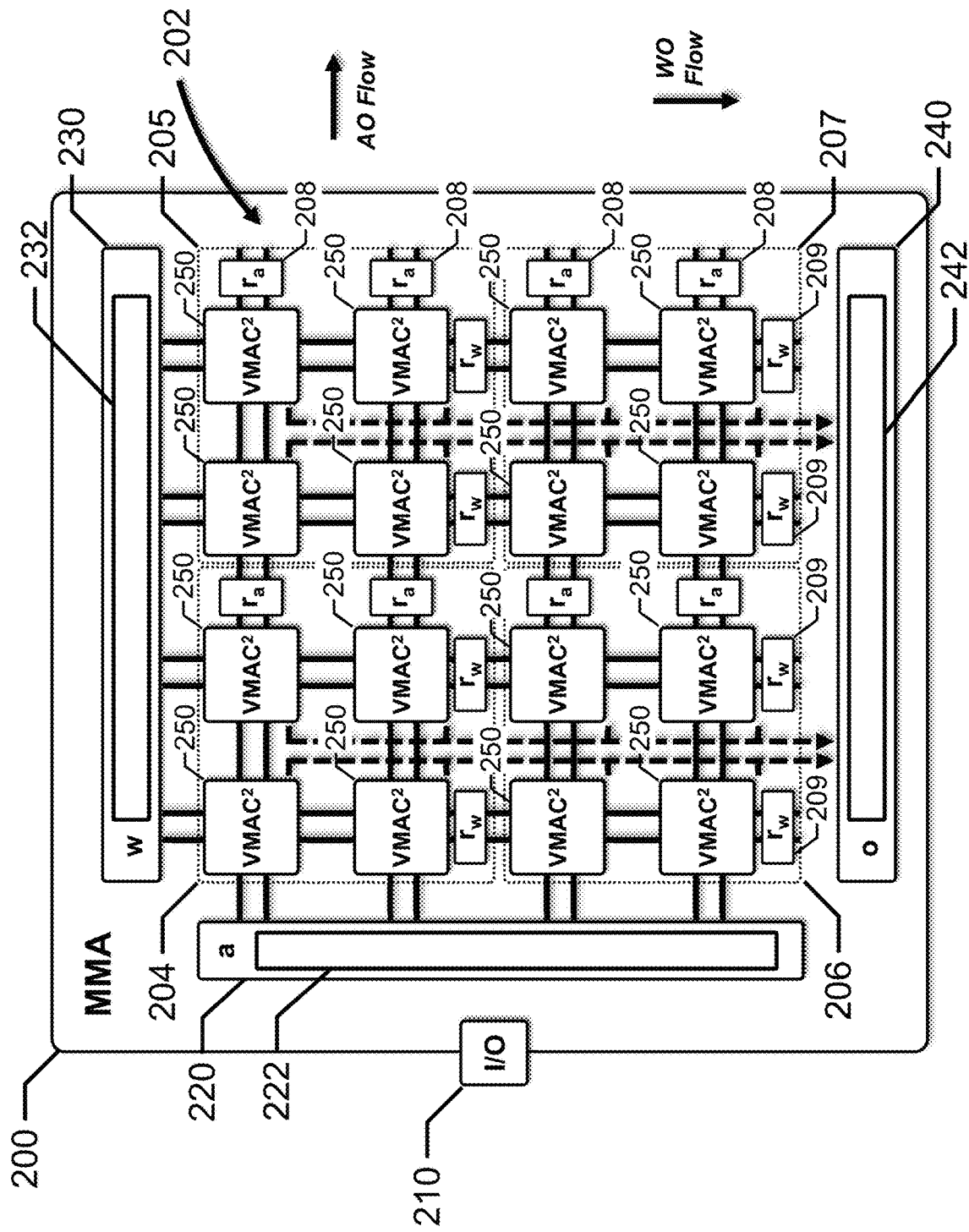
FIG. 7 depicts a block diagram of a matrix multiply accelerator (MMA), in accordance with an embodiment of the present disclosure.

FIG. 7 depicts a block diagram of an MMA, in accordance with an embodiment of the present disclosure.

MMA 200 includes $VMAC^2$ array 202, I/O interface 210, register 220, register 230 and register 240.

$VMAC^2$ array 202 includes 16 $VMAC^2$ units 250 disposed within 4 $VMAC^2$ zones 204, 205, 206, 207. Each $VMAC^2$ zone 204, 205, 206, 207 includes 4 $VMAC^2$ units 250, 2 row vector registers 208, and 2 column vector registers 209. Each $VMAC^2$ unit 250 is coupled to 2 row vector signal lines, 2 column vector signal lines and an output signal line, and is configured to calculate a dot product for one element of matrix 40. Each row vector register 208 is coupled to 2 row vector signal lines, and is configured to store one row vector. Each column vector register 209 is coupled to 2 column vector signal lines, and is configured to store one column vector. Each output signal line is coupled to register 240, which stores the elements of matrix 40. In this embodiment, each row vector includes two elements from matrix 20, and each column vector includes two elements from matrix 30.

The embodiment of MMA 200 depicted in FIG. 7 multiplies two 4×4 matrices to generate a 4×4 output matrix. In another embodiment, $VMAC^2$ array 202 may include a single $VMAC^2$ zone with 4 $VMAC^2$ units 250. In this embodiment, $VMAC^2$ array 202 does not include row vector registers or column vector registers, and MMA 200 multiplies two 2×2 matrices to generate a 2×2 output matrix. Other matrix dimensions are also contemplated, and several are discussed in more detail below.

For example, $VMAC^2$ unit 250 located in the first row and the first column (i.e., upper left corner) of $VMAC^2$ array 202 calculates the dot product of the $1^{st}$ row of matrix 20 and the $1^{st}$ column of matrix 30 to generate the element for the first row and the first column (i.e., the upper left corner) of matrix 40. Generally, the first row of $VMAC^2$ units 250 receives the first row of data from matrix 20, the second row of $VMAC^2$ units 250 receives the second row of data from matrix 20, and so on. Similarly, the first column of $VMAC^2$ units 250 receives the first column of data from matrix 30, the second column of $VMAC^2$ units 250 receives the second column of data from matrix 30, and so on. A more detailed description of the operation of $VMAC^2$ unit 250 is provided below.

I/O interface 210 is coupled to bus 110, register 220, register 230 and register 240. I/O interface 210 includes a microcontroller that sends data to, and receives data and commands from, processor 120, memory 130, etc. The microcontroller implements set of instructions that control the data flow and the operation of $VMAC^2$ units 250.

In some embodiments, a dedicated controller, microcontroller, field programmable gate array (FPGA), etc., may control the data flow and the operation of MMA 200. For example, the controller may implement load/store (L/S) instructions, memory mapped I/O (MMIO), direct memory access (DMA), etc., to load the matrices 20 and 30 into registers 220 and 230, respectively, start the matrix multiply operation, read back the output matrix from register 240, etc. More particularly, one or more software modules 134, executing on processor 120, may process the matrices, send these data and the appropriate commands to MMA 200 to upload registers 220 and 230, start the matrix multiply operation, read back the results from register 240, etc.

Register 220 includes vector register 222 to store row vectors from the first matrix to be multiplied, such as matrix 20. The row vectors are created by flattening and arranging the elements of matrix 20 in a particular manner, which is discussed in more detail below. In one embodiment, vector register 222 is 8 elements wide and 3 elements deep, each element being the same size as the data contained within matrix 20, such as, for example, 8 bit integer data, 16 bit integer data, 32 bit integer data, 16 bit floating point data, 16 bit Bfloat data, 32 bit floating point data, etc. In other embodiments, vector register 222 has a depth of 4 or more registers, which allows multiple matrices to be stored in a pipeline.

Register 230 includes vector register 232 to store column vectors from the second matrix to be multiplied, such as matrix 30. The column vectors are created by flattening and arranging the elements of matrix 30 in a particular manner, which is discussed in more detail below. In one embodiment, vector register 232 is 8 elements wide and 3 elements deep, each element being the same size as the data contained within matrix 30, such as, for example, 8 bit integer data, 16 bit integer data, 32 bit integer data, 16 bit floating point data, 16 bit Bfloat data, 32 bit floating point data, etc. In certain embodiments, vector register 232 has a depth of 4 or more registers, which allows multiple matrices to be stored in a pipeline.

Register 240 includes vector register 242, which stores the elements of the output matrix in the multiplication operation, such as matrix 40. In this embodiment, vector register 242 is 16 elements wide, each element being the same size as the data contained within matrix 40, such as, for example, 8 bit integer data, 16 bit integer data, 32 bit integer data, 16 bit floating point data, 16 bit Bfloat data, 32 bit floating point data, etc. In certain embodiments, vector register 242 has a depth of one, which allows a single output matrix to be stored at one time. In other embodiments, vector register 242 has a depth of two or more, which allows multiple output matrices to be stored in a pipeline. Vector registers 222, 232 and 242 all have the same size, such as, for example, 8 bit integer data, etc.

Figure 8:
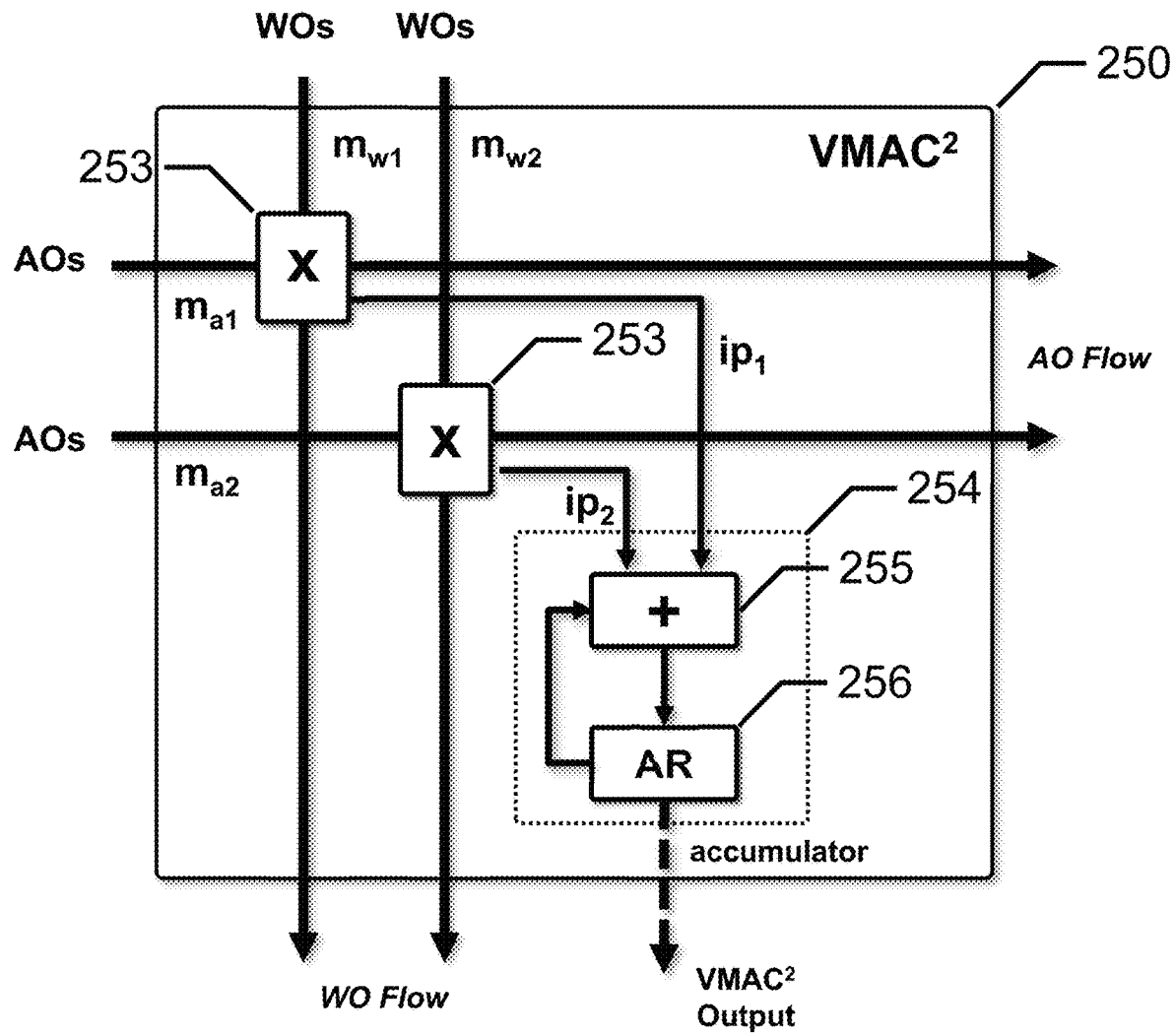
FIG. 8 depicts a block diagram of a $VMAC^2$ unit for an MMA, in accordance with an embodiment of the present disclosure.

FIG. 8 depicts a block diagram of a VMAC² unit for an MMA, in accordance with an embodiment of the present disclosure.

VMAC² unit 250 includes a first multiplier circuit 253, a second multiplier circuit 253, and accumulator circuit 254 coupled to the first and second multiplier circuits 253. The first multiplier circuit 253 multiplies the data value, $m_{a1}$, provided by the first AO row vector signal line, and the data value, $m_{w1}$, provided by first WO column vector signal line, and outputs the resulting data value or intermediate product, $ip_1$, to accumulator circuit 254. The second multiplier circuit 253 multiplies the data value, mat, provided by the second AO row vector signal line, and the data value, $m_{w2}$, provided by second WO column vector signal line, and outputs the resulting data value or intermediate product, $ip_2$, to accumulator circuit 254.

Accumulator circuit 254 includes adder circuit 255 and accumulator register 256. Adder circuit 255 adds the intermediate products $ip_1$ and $ip_2$ from the first and second multiplier circuits 253 with the current data value stored in accumulator register 256, and outputs the resulting data value to accumulator register 256. At the end of each dot product calculation cycle, described in more detail below, accumulator register 256 outputs a final accumulated data value. In other words, accumulator circuit 254 receives the respective intermediate products $ip_1$ and $ip_2$ from the first and second multiplier circuits 253, and accumulates the respective intermediate products into a value for one element of matrix 40. In alternative embodiments, accumulator register 256 simply outputs the current data value each time a new data value is received from adder circuit 255.

Accordingly, in this embodiment, VMAC² unit 250 advantageously performs 2 MAC operations in a single VMAC processing cycle, which reduces hardware power consumption, hardware costs, processing latency, etc.

When compared to MAC array 8 at the same throughput level, VMAC² array 202 advantageously reduces the number of flops by 2×, the number of accumulation registers by 2×, and the latency by 2×.

Figure 9:
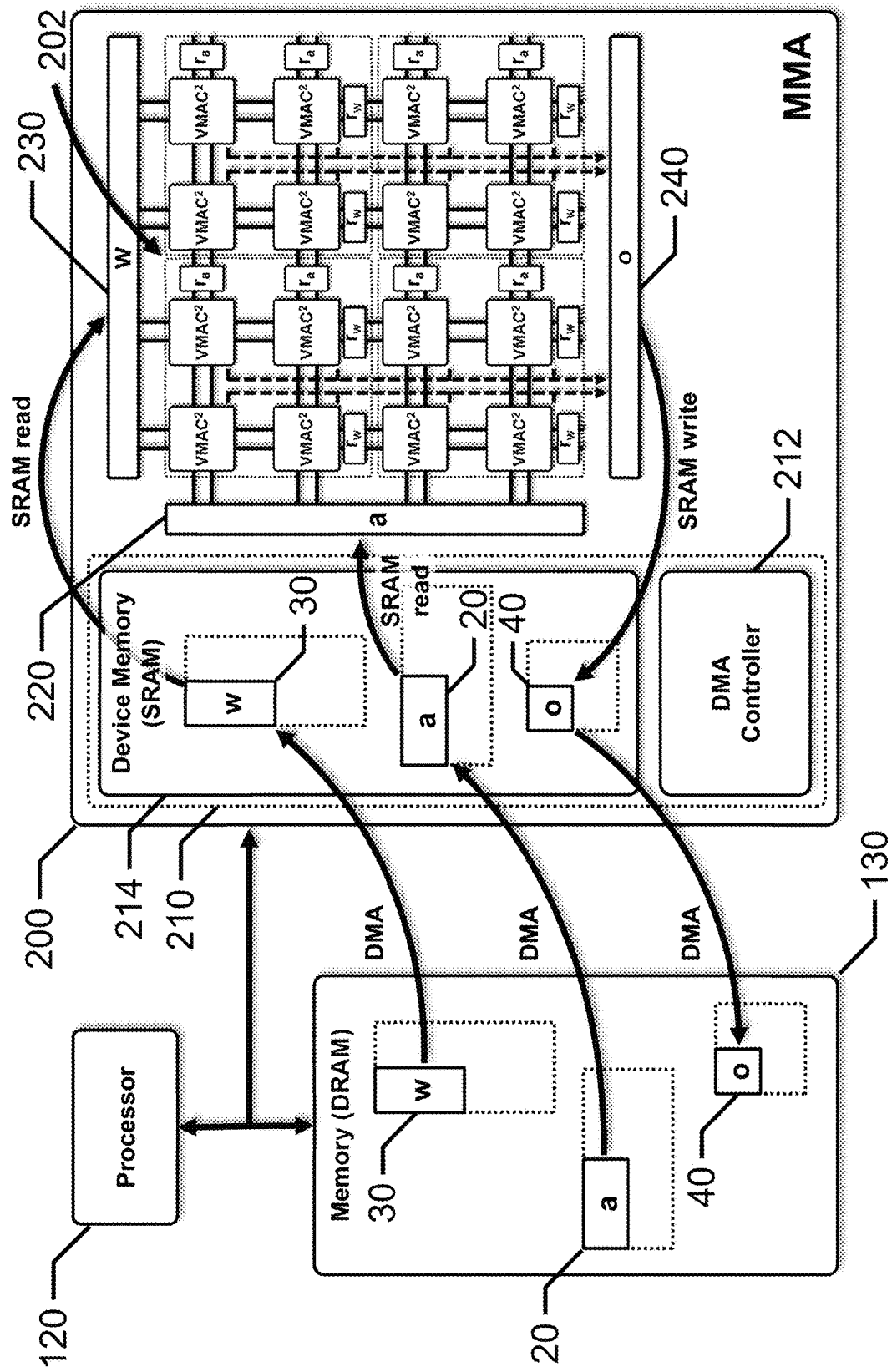
FIG. 9 depicts a general dataflow diagram for a system with an MMA, in accordance with an embodiment of the present disclosure.

FIG. 9 depicts a general dataflow diagram for a system with an MMA, in accordance with an embodiment of the present disclosure.

In this embodiment, I/O interface 210 includes direct memory access (DMA) controller 212 and device memory 214, such as, for example, SRAM. Under the control of processor 120 and DMA controller 212, matrix 20 is transferred from memory 130 to device memory 214, and matrix 30 is transferred from memory 130 to device memory 214. Under control of DMA controller 212, matrix 20 is transferred from device memory 214 to register 220, matrix 30 is transferred from device memory 214 to register 230. After the completion of the matrix multiply operation and under the control of DMA controller 212, matrix 40 is transferred from register 240 to device memory 214, and then, under the control of DMA controller 212 and processor 120, matrix 40 is transferred from device memory 214 to memory 130.

Figure 10:
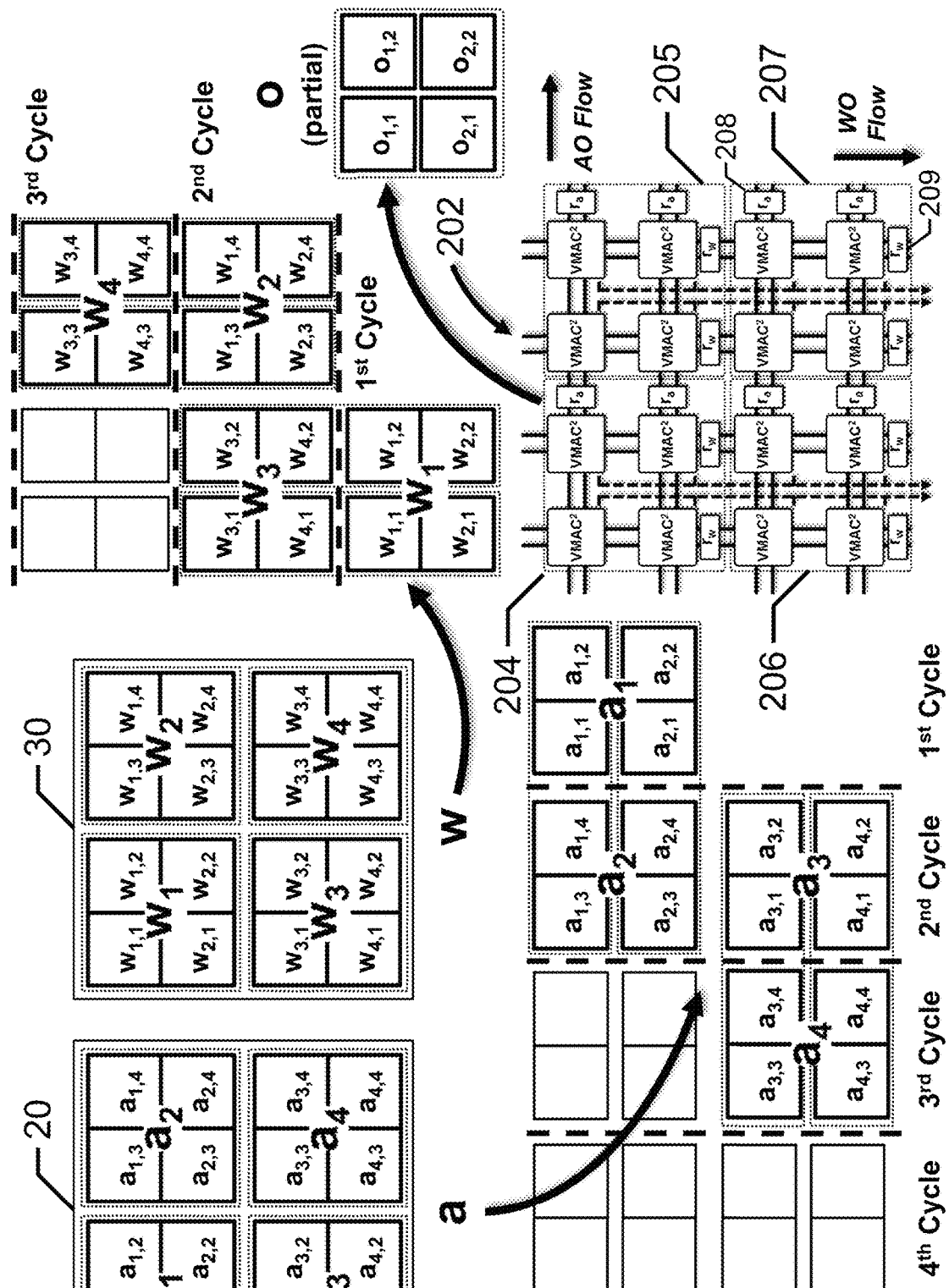
FIG. 10 depicts a general dataflow diagram for a $VMAC^2$ array, in accordance with an embodiment of the present disclosure.

FIG. 10 depicts a general dataflow diagram for a VMAC² array, in accordance with an embodiment of the present disclosure.

VMAC² array 202 includes 16 VMAC² units 250 disposed within 4 VMAC² zones 204, 205, 206, 207, and each VMAC² zone includes 4 VMAC² units 250, 2 row vector registers 208, and 2 column vector registers 209, as depicted in FIGS. 7 and 9.

The elements of matrix 20 are identified by row number and column number, i.e., $a_{i,j}$, and are divided into four quadrants, $a_1$, $a_2$, $a_3$ and $a_4$. Quadrant $a_1$ includes $a_{1,1}$, $a_{1,2}$, $a_{2,1}$ and $a_{2,2}$, quadrant $a_2$ includes $a_{1,3}$, $a_{1,4}$, $a_{2,3}$ and $a_{2,4}$, quadrant $a_3$ includes $a_{3,1}$, $a_{3,2}$, $a_{4,1}$ and $a_{4,2}$, and quadrant $a_4$ includes $a_{3,3}$, $a_{3,4}$, $a_{4,3}$ and $a_{4,4}$. The elements of matrix 30 are identified by row number and column number, i.e., $w_{i,j}$, and are divided into four quadrants, $w_1$, $w_2$, $w_3$ and $w_4$. Quadrant $w_1$ includes $w_{1,1}$, $w_{1,2}$, $w_{2,1}$ and $w_{2,2}$, quadrant $w_2$ includes $w_{1,3}$, $w_{1,4}$, $w_{2,3}$ and $w_{2,4}$, quadrant $w_3$ includes $w_{3,1}$, $w_{3,2}$, $w_{4,1}$ and $w_{4,2}$, and quadrant $w_4$ includes $w_{3,3}$, $w_{3,4}$, $w_{4,3}$ and $w_{4,4}$. Similarly, the elements of matrix 40 may be identified by row number and column number, i.e., $o_{i,j}$, and may be divided into four quadrants, $o_1$, $o_2$, $o_3$ and $o_4$. Quadrant $o_1$ includes $o_{1,1}$, $o_{1,2}$, $o_{2,1}$ and $o_{2,2}$, quadrant $o_2$ includes $o_{1,3}$, $o_{1,4}$, $o_{2,3}$ and $o_{2,4}$, quadrant $o_3$ includes $o_{3,1}$, $o_{3,2}$, $o_{4,1}$ and $o_{4,2}$, and quadrant $o_4$ includes $o_{3,3}$, $o_{3,4}$, $o_{4,3}$ and $o_{4,4}$.

During the first VMAC processing cycle, vector register 222 provides 2 row vectors from quadrant $a_1$ to VMAC² zone 204 via 4 row vector signal lines, and vector register 232 provides 2 column vectors from quadrant $w_1$ to VMAC² zone 204 via 4 column vector signal lines. The first row vector is $a_{1,1}$, $a_{1,2}$, the second row vector is $a_{2,1}$, $a_{2,2}$, the first column vector is $w_{1,1}$, $w_{2,1}$, and the second column vector is $w_{3,1}$, $w_{4,1}$. VMAC² zone 204 multiplies the row vectors from quadrant $a_1$ and the column vectors from quadrant $w_1$, and accumulates the intermediate products. More particularly, each VMAC² unit 250 within VMAC² zone 204 multiplies one row vector from quadrant $a_1$ and one column vector from quadrant $w_1$, and accumulates the intermediate product.

Figure 11:
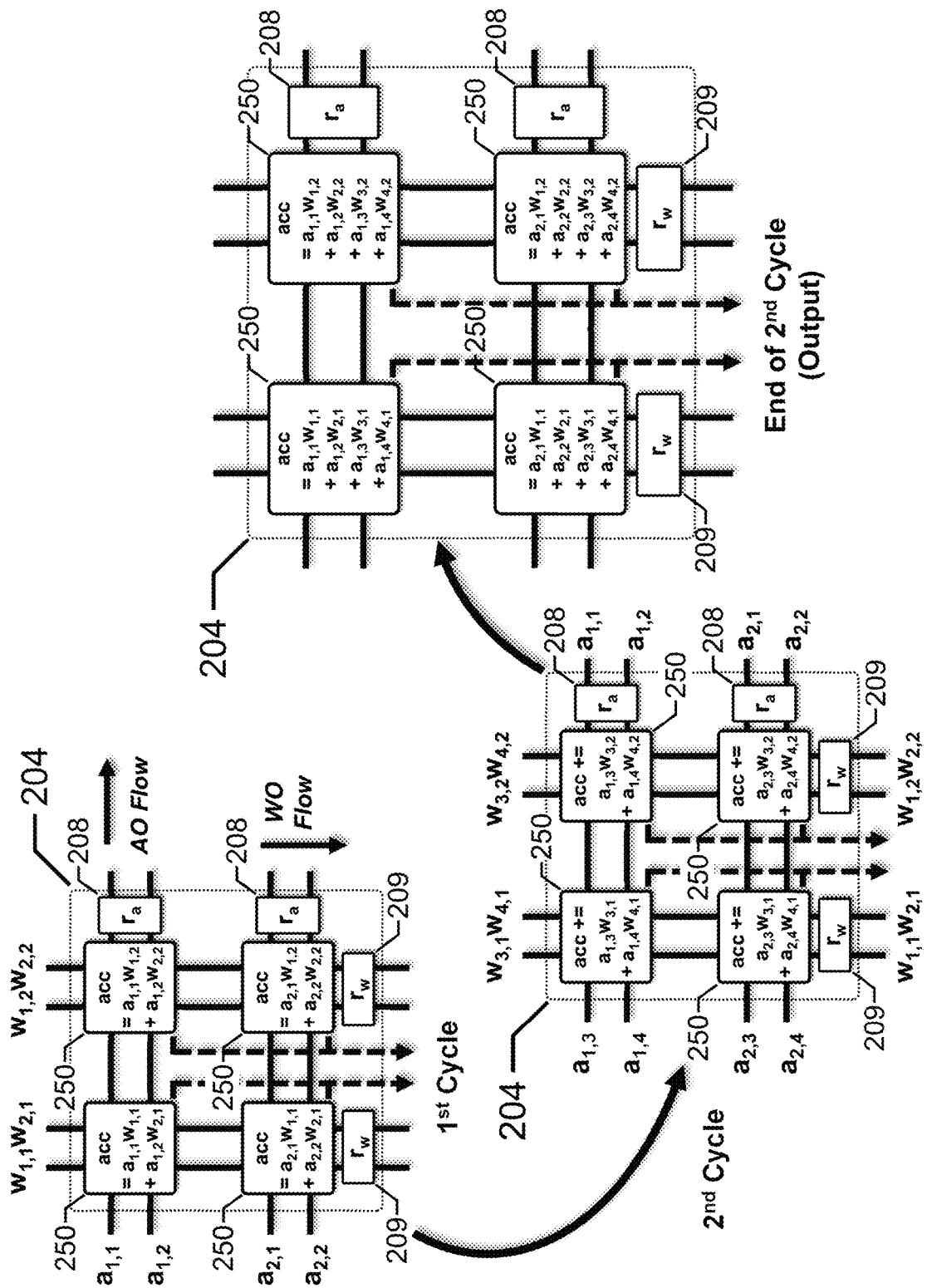
FIG. 11 depicts a dataflow diagram for a $VMAC^2$ unit, in accordance with an embodiment of the present disclosure.

For example, referring to FIG. 11, the upper left VMAC² unit 250 multiplies first row vector $a_{1,1}$, $a_{1,2}$ and the first column vector $w_{1,1}$, $w_{2,1}$, and accumulates the intermediate products. The upper right VMAC² unit 250 multiplies the first row vector $a_{1,1}$, $a_{1,2}$ and the second column vector $w_{1,2}$, $w_{2,2}$, and accumulates the intermediate products. The lower left VMAC² unit 250 multiplies the second row vector $a_{2,1}$, $a_{2,2}$ and the first column vector $w_{1,1}$, $w_{2,1}$, and accumulates the intermediate products. The lower right VMAC² unit 250 multiplies the second row vector $a_{2,1}$, $a_{2,2}$ and the second column vector $w_{1,2}$, $w_{2,2}$, and accumulates the intermediate products. Each row vector is then stored in a row vector register 208 of VMAC² zone 204, and each column vector is stored in a column vector register 209 of VMAC² zone 204. At the end of the first VMAC processing cycle, 50% of the dot product for the first quadrant $o_1$ of matrix 40 has been calculated by the VMAC² units 250 within VMAC² zone 204.

VMAC² zones 205, 206 and 207 are idle or processing data from a previous matrix multiplication process during the first VMAC processing cycle.

During the second VMAC processing cycle, vector register 222 provides 2 row vectors from quadrant $a_2$ to VMAC² zone 204, and vector register 232 provides 2 column vectors from quadrant $w_3$ to VMAC² zone 204. The first row vector is $a_{1,3}$, $a_{1,4}$, the second row vector is $a_{2,3}$, $a_{2,4}$, the first column vector is $w_{3,1}$, $w_{4,1}$, and the second column vector is $w_{3,2}$, $w_{4,2}$. VMAC² zone 204 multiplies the row vectors from quadrant $a_2$ and the column vectors from quadrant $w_3$, and accumulates the intermediate products. More particularly, each VMAC² unit 250 within VMAC² zone 204 multiplies one row vector from quadrant $a_2$ and one column vector from quadrant $w_3$, and accumulates the intermediate product.

For example, referring again to FIG. 11, the upper left VMAC$^2$ unit 250 multiplies first row vector $a_{1,3}$, $a_{1,4}$ and the first column vector $w_{3,1}$, $w_{4,1}$, and accumulates the intermediate products. The upper right VMAC$^2$ unit 250 multiplies the first row vector $a_{1,3}$, $a_{1,4}$ and the second column vector $w_{3,2}$, $w_{4,2}$, and accumulates the intermediate products. The lower left VMAC$^2$ unit 250 multiplies the second row vector $a_{2,3}$, $a_{2,4}$ and the first column vector $w_{3,1}$, $w_{4,1}$, and accumulates the intermediate products. The lower right VMAC$^2$ unit 250 multiplies the second row vector $a_{2,3}$, $a_{2,4}$ and the second column vector $w_{3,2}$, $w_{4,2}$, and accumulates the intermediate products. Each row vector is then stored in a row vector register 208 of VMAC$^2$ zone 204, and each column vector is stored in a column vector register 209 of VMAC$^2$ zone 204. At the end of the second VMAC processing cycle, 100% of the dot product for the first quadrant $o_1$ of matrix 40 has been calculated by the VMAC$^2$ units 250 within VMAC$^2$ zone 204, and the accumulated results are output to vector register 242 as the elements of quadrant $o_1$ of matrix 40, i.e., $o_{1,1}$, $o_{1,2}$, $o_{2,1}$ and $o_{2,2}$.

Row vector registers 208 of VMAC$^2$ zone 204 provide 2 row vectors from quadrant $a_1$ to VMAC$^2$ zone 205, and vector register 232 provides 2 column vectors from quadrant $w_2$ to VMAC$^2$ zone 205. The first row vector is $a_{1,1}$, $a_{1,2}$, the second row vector is $a_{2,1}$, $a_{2,2}$, the first column vector is $w_{1,3}$, $w_{2,3}$, and the second column vector is $w_{1,4}$, $w_{2,4}$. VMAC$^2$ zone 205 multiplies the row vectors from quadrant $a_1$ and the column vectors from quadrant $w_2$, and accumulates the intermediate products. More particularly, each VMAC$^2$ unit 250 within VMAC$^2$ zone 205 multiplies one row vector from quadrant $a_1$ and one column vector from quadrant $w_2$, and accumulates the intermediate product. Each row vector is then stored in a row vector register 208 of VMAC$^2$ zone 205, and each column vector is stored in a column vector register 209 of VMAC$^2$ zone 205. At the end of the second VMAC processing cycle, 50% of the dot product for the second quadrant $o_2$ of matrix 40 has been calculated by the VMAC$^2$ units 250 within VMAC$^2$ zone 205.

Vector register 222 provides 2 row vectors from quadrant $a_3$ to VMAC$^2$ zone 206, and column vector registers 209 of VMAC$^2$ zone 204 provide 2 column vectors from quadrant $w_1$ to VMAC$^2$ zone 206. The first row vector is $a_{3,1}$, $a_{3,2}$, the second row vector is $a_{4,1}$, $a_{4,2}$, the first column vector is $w_{1,1}$, $w_{2,1}$, and the second column vector is $w_{1,2}$, $w_{2,2}$. VMAC$^2$ zone 206 multiplies the row vectors from quadrant $a_3$ and the column vectors from quadrant $w_1$, and accumulates the intermediate products. More particularly, each VMAC$^2$ unit 250 within VMAC$^2$ zone 206 multiplies one row vector from quadrant $a_3$ and one column vector from quadrant $w_1$, and accumulates the intermediate product. Each row vector is then stored in a row vector register 208 of VMAC$^2$ zone 206, and each column vector is stored in a column vector register 209 of VMAC$^2$ zone 206. At the end of the second VMAC processing cycle, 50% of the dot product for the third quadrant $o_3$ of matrix 40 has been calculated by the VMAC$^2$ units 250 within VMAC$^2$ zone 206.

VMAC$^2$ zone 207 is idle or processing data from a previous matrix multiplication process.

During the third VMAC processing cycle, VMAC$^2$ zone 204 is idle or processing data for the next matrix multiplication process.

Row vector registers 208 of VMAC$^2$ zone 204 provide 2 row vectors from quadrant $a_2$ to VMAC$^2$ zone 205, and vector register 232 provides 2 column vectors from quadrant $w_4$ to VMAC$^2$ zone 205. The first row vector is $a_{1,3}$, $a_{1,4}$, the second row vector is $a_{2,3}$, $a_{2,4}$, the first column vector is $w_{3,3}$, $w_{4,3}$, and the second column vector is $w_{3,4}$, $w_{4,4}$. VMAC$^2$ zone 205 multiplies the row vectors from quadrant $a_2$ and the column vectors from quadrant $w_4$, and accumulates the intermediate products. More particularly, each VMAC$^2$ unit 250 within VMAC$^2$ zone 205 multiplies one row vector from quadrant $a_2$ and one column vector from quadrant $w_4$, and accumulates the intermediate product. Each row vector is then stored in a row vector register 208 of VMAC$^2$ zone 205, and each column vector is stored in a column vector register 209 of VMAC$^2$ zone 205. At the end of the third VMAC processing cycle, 100% of the dot product for the second quadrant $o_2$ of matrix 40 has been calculated by the VMAC$^2$ units 250 within VMAC$^2$ zone 205, and the accumulated results are output to vector register 242 as the elements of quadrant $o_2$ of matrix 40, i.e., $o_{1,3}$, $o_{1,4}$, $o_{2,3}$ and $o_{2,4}$.

Vector register 222 provides 2 row vectors from quadrant $a_4$ to VMAC$^2$ zone 206, and column vector registers 209 of VMAC$^2$ zone 204 provide 2 column vectors from quadrant $w_3$ to VMAC$^2$ zone 206. The first row vector is $a_{3,3}$, $a_{3,4}$, the second row vector is $a_{4,3}$, $a_{4,4}$, the first column vector is $w_{3,1}$, $w_{4,1}$, and the second column vector is $w_{3,2}$, $w_{4,2}$. VMAC$^2$ zone 206 multiplies the row vectors from quadrant $a_4$ and the column vectors from quadrant $w_3$, and accumulates the intermediate products. More particularly, each VMAC$^2$ unit 250 within VMAC$^2$ zone 206 multiplies one row vector from quadrant $a_4$ and one column vector from quadrant $w_3$, and accumulates the intermediate product. Each row vector is then stored in a row vector register 208 of VMAC$^2$ zone 206, and each column vector is stored in a column vector register 209 of VMAC$^2$ zone 206. At the end of the third VMAC processing cycle, 100% of the dot product for the third quadrant $o_3$ of matrix 40 has been calculated by the VMAC$^2$ units 250 within VMAC$^2$ zone 206, and the accumulated results are output to vector register 242 as the elements of quadrant $o_3$ of matrix 40, i.e., $o_{3,1}$, $o_{3,2}$, $o_{4,1}$ and $o_{4,2}$.

Row vector registers 208 of VMAC$^2$ zone 206 provide 2 row vectors from quadrant $a_3$ to VMAC$^2$ zone 207, and column vector registers 209 of VMAC$^2$ zone 205 provide 2 column vectors from quadrant $w_2$ to VMAC$^2$ zone 207. The first row vector is $a_{3,1}$, $a_{3,2}$, the second row vector is $a_{1,1}$, $a_{4,2}$, the first column vector is $w_{1,3}$, $w_{2,3}$, and the second column vector is $w_{1,4}$, $w_{2,4}$. VMAC$^2$ zone 207 multiplies the row vectors from quadrant $a_3$ and the column vectors from quadrant $w_2$, and accumulates the intermediate products. More particularly, each VMAC$^2$ unit 250 within VMAC$^2$ zone 207 multiplies one row vector from quadrant $a_3$ and one column vector from quadrant $w_2$, and accumulates the intermediate product. Each row vector is then stored in a row vector register 208 of VMAC$^2$ zone 207, and each column vector is stored in a column vector register 209 of VMAC$^2$ zone 207. At the end of the third VMAC processing cycle, 50% of the dot product for the fourth quadrant $o_4$ of matrix 40 has been calculated by the VMAC$^2$ units 250 within VMAC$^2$ zone 207.

During the fourth VMAC processing cycle, VMAC$^2$ zones 204, 205 and 206 are idle or processing data for the next matrix multiplication process.

Row vector registers 208 of VMAC$^2$ zone 206 provide 2 row vectors from quadrant $a_4$ to VMAC$^2$ zone 207, and column vector registers 209 of VMAC$^2$ zone 205 provide 2 column vectors from quadrant $w_4$ to VMAC$^2$ zone 207. The first row vector is $a_{3,3}$, $a_{3,4}$, the second row vector is $a_{4,3}$, $a_{4,4}$, the first column vector is $w_{3,3}$, $w_{4,3}$, and the second column vector is $w_{3,4}$, $w_{4,4}$. VMAC$^2$ zone 207 multiplies the row vectors from quadrant $a_4$ and the column vectors from quadrant $w_4$, and accumulates the intermediate products.

More particularly, each VMAC² unit 250 within VMAC² zone 207 multiplies one row vector from quadrant $a_4$ and one column vector from quadrant $w_4$, and accumulates the intermediate product. Each row vector is then stored in a row vector register 208 of VMAC² zone 207, and each column vector is stored in a column vector register 209 of VMAC² zone 207. At the end of the fourth VMAC processing cycle, 100% of the dot product for the fourth quadrant $o_4$ of matrix 40 has been calculated by the VMAC² units 250 within VMAC² zone 207, and the accumulated results are output to vector register 242 as the elements of quadrant $o_4$ of matrix 40, i.e., $o_{3,3}$, $o_{3,4}$, $o_{4,3}$ and $o_{4,4}$.

Figure 12A:
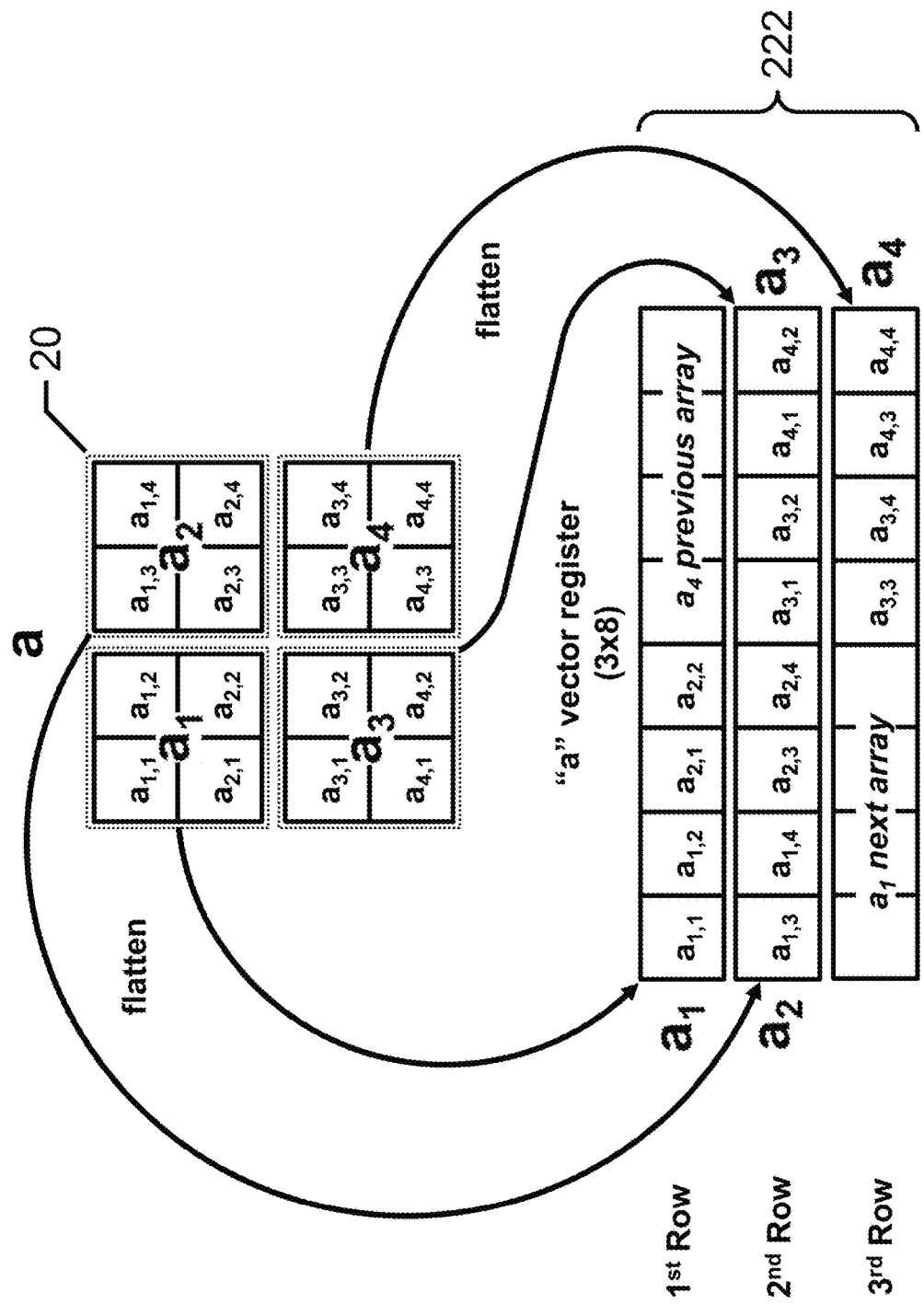
FIGS. 12A and 12B depict matrix flattening processes, in accordance with an embodiment of the present disclosure.
Figure 12B:
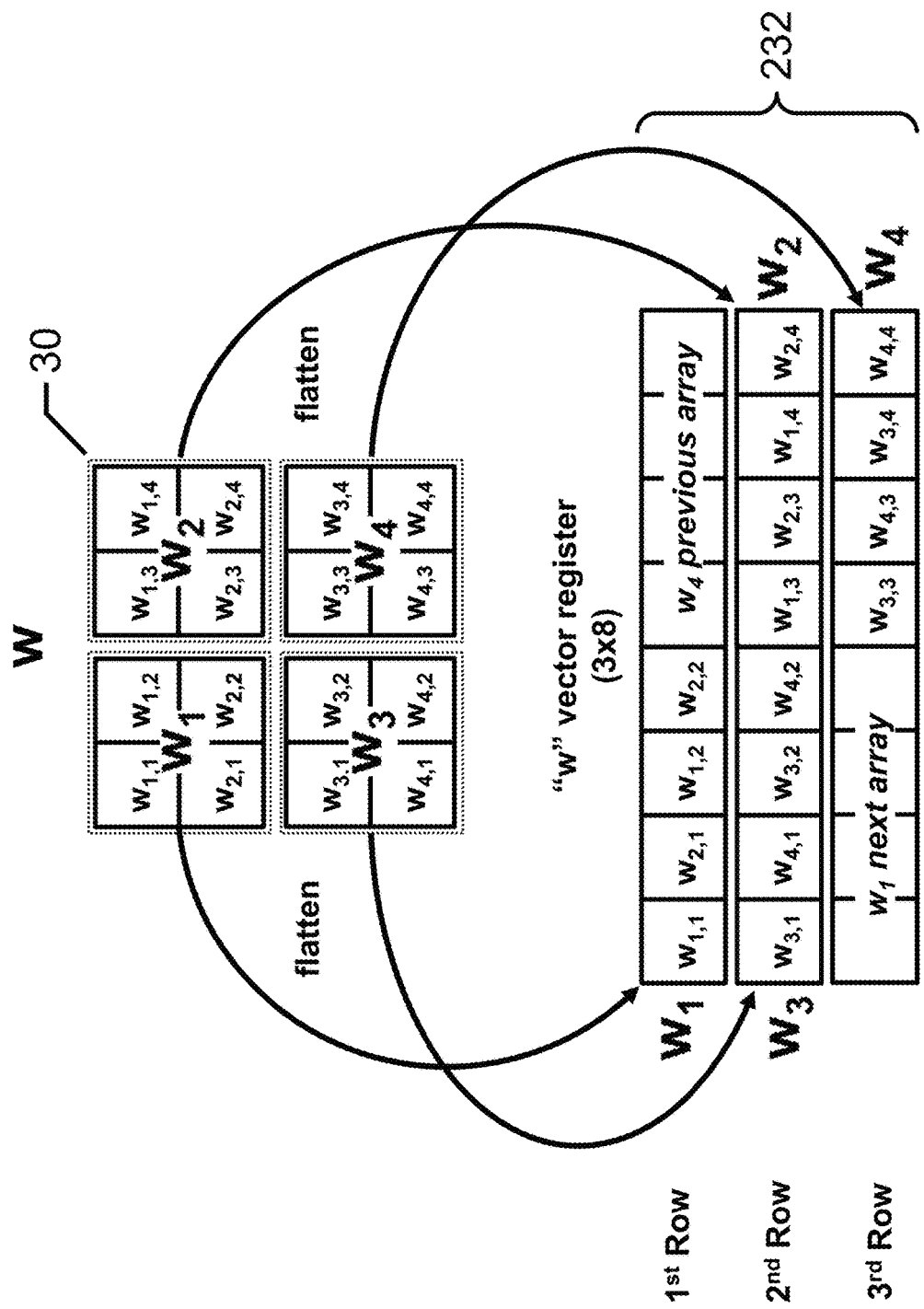

FIGS. 12A and 12B depict matrix flattening processes, in accordance with an embodiment of the present disclosure.

Matrices 20 and 30 may be flattened from a matrix representation that is stored in a memory (i.e., e.g., row-major order or column-major order) to a vector representation that is stored, in the proper order, in a vector register. In this embodiment, vector registers 222 and 232 each store 3 rows of 8 elements (3×8), and each row stores four, 2 element vectors; other register dimensions are also contemplated, such as, for example, 1×8, 6×8, 9×8, etc.

Matrix 20 is flattened by storing, in a row-wise manner, quadrant $a_1$ in row 1, quadrants $a_2$ and $a_3$ in row 2, and quadrant $a_4$ in row 3 in vector register 222, as depicted in FIG. 12A. Since quadrant $a_1$ only occupies 50% of row 1 of vector register 222, the remaining elements may store quadrant $a_4$ of the previous matrix multiplication process (i.e., a pipeline processing scenario), or elements having values of zero. Similarly, since quadrant $a_4$ only occupies 50% of row 3 of vector register 222, the remaining elements may store quadrant $a_1$ of the next matrix multiplication process (a pipeline processing scenario), or elements having values of zero.

Matrix 30 is flattened by storing, in a column-wise manner, quadrant $w_1$ in row 1, quadrants $w_3$ and $w_2$ in row 2, and quadrant $w_4$ in row 3 in vector register 232, as depicted in FIG. 12B. Since quadrant $w_1$ only occupies 50% of row 1 of vector register 232, the remaining elements may store quadrant $w_4$ of the previous matrix multiplication process (i.e., a pipeline processing scenario), or elements having values of zero. Similarly, since quadrant $w_4$ only occupies 50% of row 3 of vector register 232, the remaining elements may store quadrant $w_1$ of the next matrix multiplication process (a pipeline processing scenario), or elements having values of zero.

Figure 13:
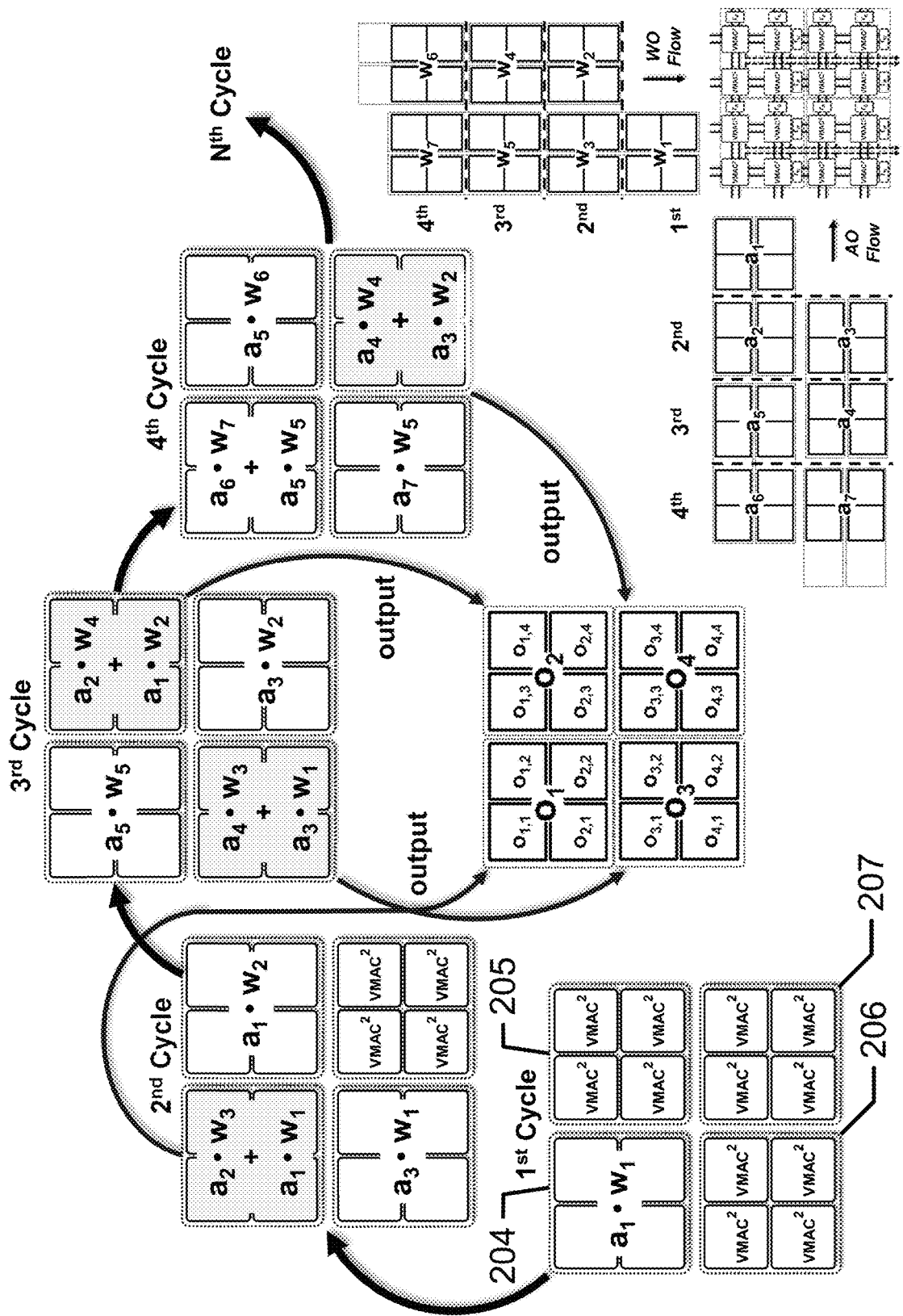
FIG. 13 depicts a detailed dataflow diagram for a matrix multiplication process, in accordance with an embodiment of the present disclosure.

FIG. 13 depicts a detailed dataflow diagram for a matrix multiplication process, in accordance with an embodiment of the present disclosure.

During the first VMAC processing cycle, VMAC² zone 204 multiplies the row vectors from quadrant $a_1$ and the column vectors from quadrant $w_1$, and accumulates the intermediate products. While VMAC² zones 205, 206 and 207 may be processing data from a previous matrix multiplication process, in this embodiment, these VMAC² zones are idle.

During the second VMAC processing cycle, VMAC² zone 204 multiplies the row vectors from quadrant $a_2$ and the column vectors from quadrant $w_3$, and accumulates the intermediate products. VMAC² zone 205 multiplies the row vectors from quadrant $a_1$ and the column vectors from quadrant $w_2$, and accumulates the intermediate products. VMAC² zone 206 multiplies the row vectors from quadrant $a_3$ and the column vectors from quadrant $w_1$, and accumulates the intermediate products. While VMAC² zone 207 may be processing data from a previous matrix multiplication process, in this embodiment, VMAC² zone 207 is idle.

At the end of the second VMAC processing cycle, VMAC² zone 204 outputs the accumulated results to vector register 242 as the elements of quadrant $o_1$ of matrix 40, i.e., $o_{1,1}$, $o_{1,2}$, $o_{2,1}$ and $o_{2,2}$.

During the third VMAC processing cycle, VMAC² zone 204 multiplies the row vectors from quadrant $a_5$ and the column vectors from quadrant $w_5$ (of the next matrix multiplication process), and accumulates the intermediate products. VMAC² zone 205 multiplies the row vectors from quadrant $a_2$ and the column vectors from quadrant $w_4$, and accumulates the intermediate products. VMAC² zone 206 multiplies the row vectors from quadrant $a_4$ and the column vectors from quadrant $w_3$, and accumulates the intermediate products. VMAC² zone 207 multiplies the row vectors from quadrant $a_3$ and the column vectors from quadrant $w_2$, and accumulates the intermediate products. At the end of the third VMAC processing cycle, VMAC² zone 205 outputs the accumulated results to vector register 242 as the elements of quadrant $o_2$ of matrix 40, i.e., $o_{1,3}$, $o_{1,4}$, $o_{2,3}$ and $o_{2,4}$, and VMAC² zone 206 outputs the accumulated results to vector register 242 as the elements of quadrant $o_3$ of matrix 40, i.e., $o_{3,1}$, $o_{3,2}$, $o_{4,1}$ and $o_{4,2}$.

During the fourth VMAC processing cycle, VMAC² zone 204 multiplies the row vectors from quadrant $a_6$ and the column vectors from quadrant $w_7$ (of the next matrix multiplication process), and accumulates the intermediate products. VMAC² zone 205 multiplies the row vectors from quadrant $a_5$ and the column vectors from quadrant $w_6$ (of the next matrix multiplication process), and accumulates the intermediate products. VMAC² zone 206 multiplies the row vectors from quadrant $a_7$ and the column vectors from quadrant $w_5$ (of the next matrix multiplication process), and accumulates the intermediate products. VMAC² zone 207 multiplies the row vectors from quadrant $a_4$ and the column vectors from quadrant $w_4$, and accumulates the intermediate products. At the end of the fourth VMAC processing cycle, VMAC² zone 207 outputs the accumulated results to vector register 242 as the elements of quadrant $o_4$ of matrix 40, i.e., $o_{3,3}$, $o_{3,4}$, $o_{4,3}$ and $o_{4,4}$.

Figure 14:
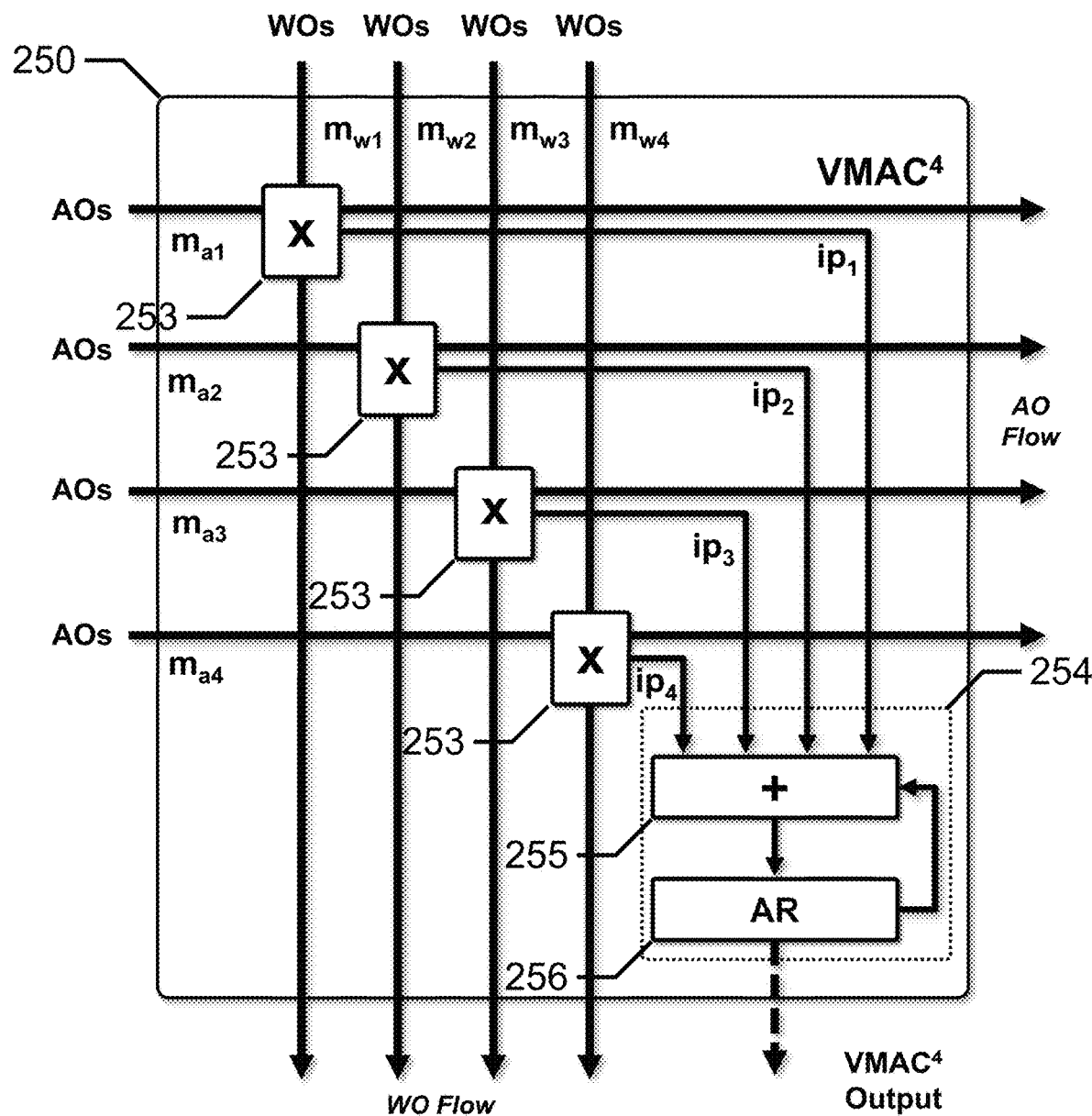
FIG. 14 depicts a block diagram of a $VMAC^4$ unit for an MMA, in accordance with an embodiment of the present disclosure.

FIG. 14 depicts a block diagram of a VMAC⁴ unit for an MMA, in accordance with an embodiment of the present disclosure.

Advantageously, embodiments of the present disclosure may include n multiplication circuits 253 within each VMAC" unit. FIG. 14 depicts a VMAC⁴ unit with first, second, third and fourth multiplier circuits 253, i.e., n equals 4.

VMAC⁴ unit 250 includes a first multiplier circuit 253, a second multiplier circuit 253, a third multiplier circuit 253, a fourth multiplier circuit 253, and accumulator circuit 254 coupled to the first, second, third and fourth multiplier circuits 253. The first multiplier circuit 253 multiplies the data value, $m_{a1}$, provided by the first AO row vector signal line, and the data value, $m_{w1}$, provided by first WO column vector signal line, and outputs the resulting data value or intermediate product, $ip_1$, to accumulator circuit 254. The second multiplier circuit 253 multiplies the data value, $m_{a2}$, provided by the second AO row vector signal line, and the data value, $m_{w2}$, provided by second WO column vector signal line, and outputs the resulting data value or intermediate product, $ip_2$, to accumulator circuit 254. The third multiplier circuit 253 multiplies the data value, $m_{a3}$, provided by the third AO row vector signal line, and the data value, $m_{w3}$, provided by third WO column vector signal line, and outputs the resulting data value or intermediate product, $ip_3$, to accumulator circuit 254. The fourth multiplier circuit 253 multiplies the data value, $m_{a4}$, provided by the fourth AO row vector signal line, and the data value, $m_{w4}$, provided by fourth WO column vector signal line, and outputs the resulting data value or intermediate product, $ip_4$, to accumulator circuit 254.

Accumulator circuit 254 includes adder circuit 255 and accumulator register 256. Adder circuit 255 adds the intermediate products $ip_1$, $ip_2$, $ip_3$ and $ip_4$ from the first, second, third and fourth multiplier circuits 253 with the current data value stored in accumulator register 256, and outputs the resulting data value to accumulator register 256. At the end of each dot product calculation cycle, accumulator register 256 outputs a final accumulated data value. In other words, accumulator circuit 254 receives the respective intermediate products $ip_1$, $ip_2$, $ip_3$ and $ip_4$ from the first, second, third and fourth multiplier circuits 253, and accumulates the respective intermediate products into a value for one element of the output matrix. In alternative embodiments, accumulator register 256 simply outputs the current data value each time a new data value is received from adder circuit 255.

In this embodiment, $VMAC^4$ unit 250 advantageously performs 4 MAC operations in a single VMAC processing cycle, which reduces hardware power consumption, hardware costs, processing latency, etc.

Figure 15:
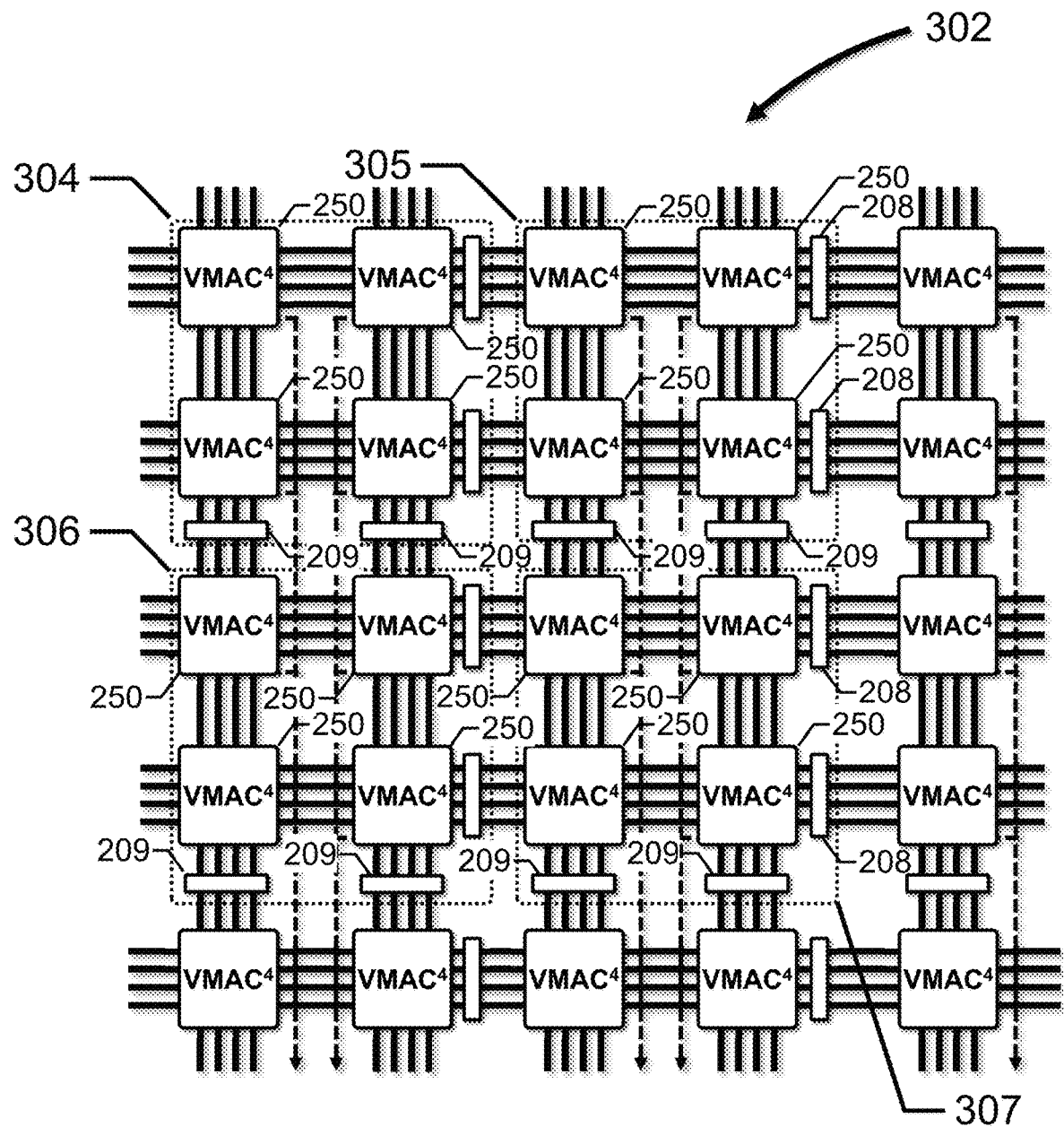
FIG. 15 depicts a block diagram of a $VMAC^4$ array for an MMA, in accordance with an embodiment of the present disclosure.

FIG. 15 depicts a block diagram of a $VMAC^4$ array for an MMA, in accordance with an embodiment of the present disclosure.

$VMAC^4$ array 302 includes 4 $VMAC^4$ zones 304, 305, 306, 307. Each $VMAC^4$ zone 304, 305, 306, 307 includes 4 $VMAC^4$ units 250, 2 row vector registers 208, and 2 column vector registers 209. Each $VMAC^4$ unit 250 is coupled to 4 row vector signal lines, 4 column vector signal lines and an output signal line, and is configured to calculate a dot product for 2, four-element vectors. Each row vector register 208 is coupled to 4 row vector signal lines, and is configured to store one row vector. Each column vector register 209 is coupled to 4 column vector signal lines, and is configured to store one column vector. Each output signal line is coupled to register 240. The first matrix dimension is 2×4 and the second matrix dimension is 4×2.

When compared to MAC array 8 at the same throughput level, this embodiment advantageously reduces the number of pipeline flip-flops by 2×, the number of accumulation registers by 4×, and the latency by 4×.

Figure 16:
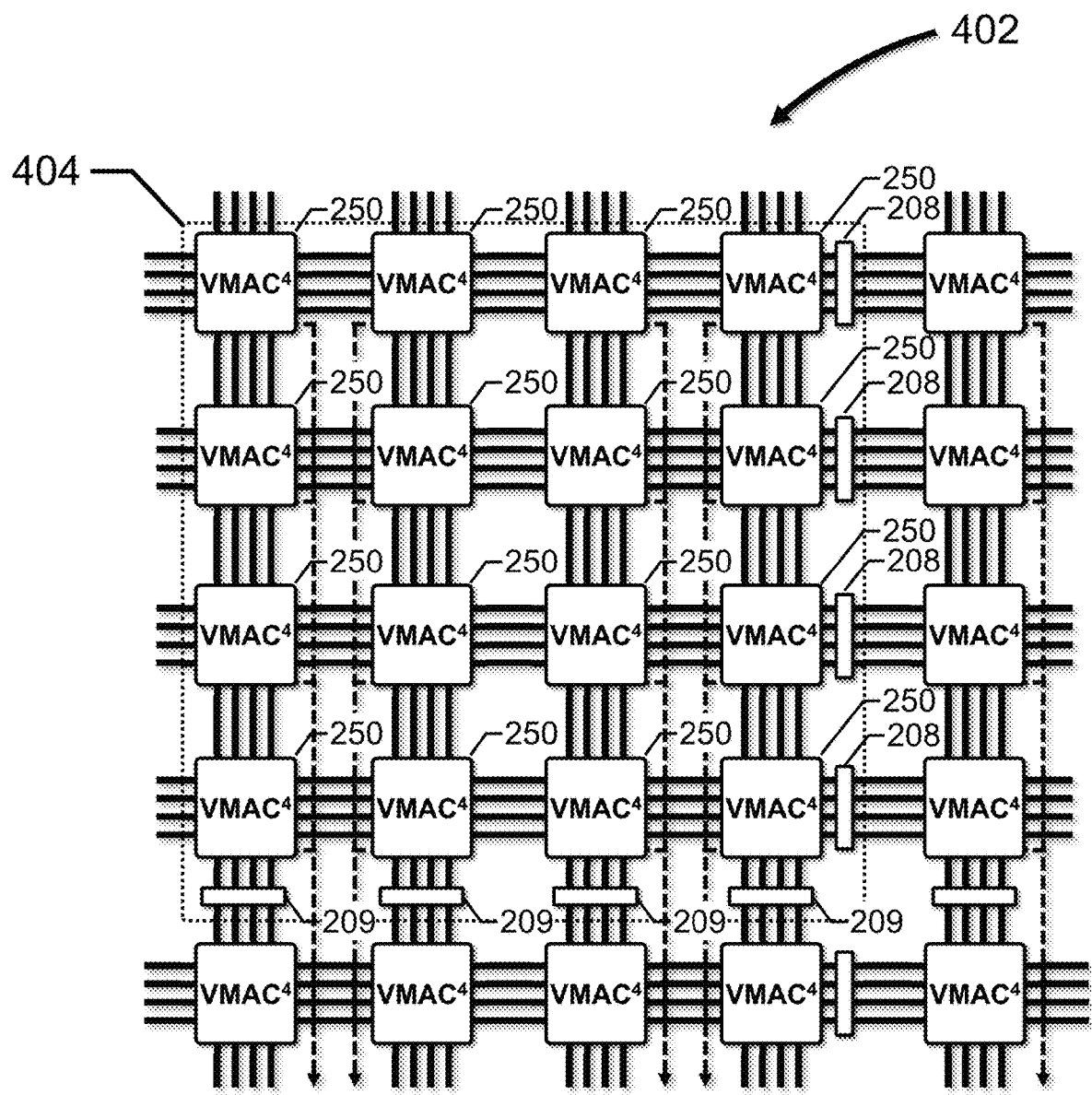
FIG. 16 depicts a block diagram of a $VMAC^4$ array for an MMA, in accordance with another embodiment of the present disclosure.

FIG. 16 depicts a block diagram of a $VMAC^4$ array for an MMA, in accordance with another embodiment of the present disclosure.

$VMAC^4$ array 402 includes $VMAC^4$ zone 404, which includes 16 $VMAC^4$ units 250, 4 row vector registers 208, and 4 column vector registers 209. Each $VMAC^4$ unit 250 is coupled to 4 row vector signal lines, 4 column vector signal lines and an output signal line, and is configured to calculate a dot product for 2, four-element vectors. Each row vector register 208 is coupled to 4 row vector signal lines, and is configured to store one row vector. Each column vector register 209 is coupled to 4 column vector signal lines, and is configured to store one column vector. Each output signal line is coupled to register 240, which stores the elements of the output matrix. In this embodiment, each row vector includes four elements from the first input matrix, and each column vector includes four elements from the second input matrix. The first input matrix dimension is 4×4 and the second input matrix dimension is 4×4.

When compared to MAC array 8 at the same throughput level, this embodiment advantageously reduces the number of pipeline flip-flops by 4×, the number of accumulation registers by 4×, and the latency by 4×.

Figure 17A:
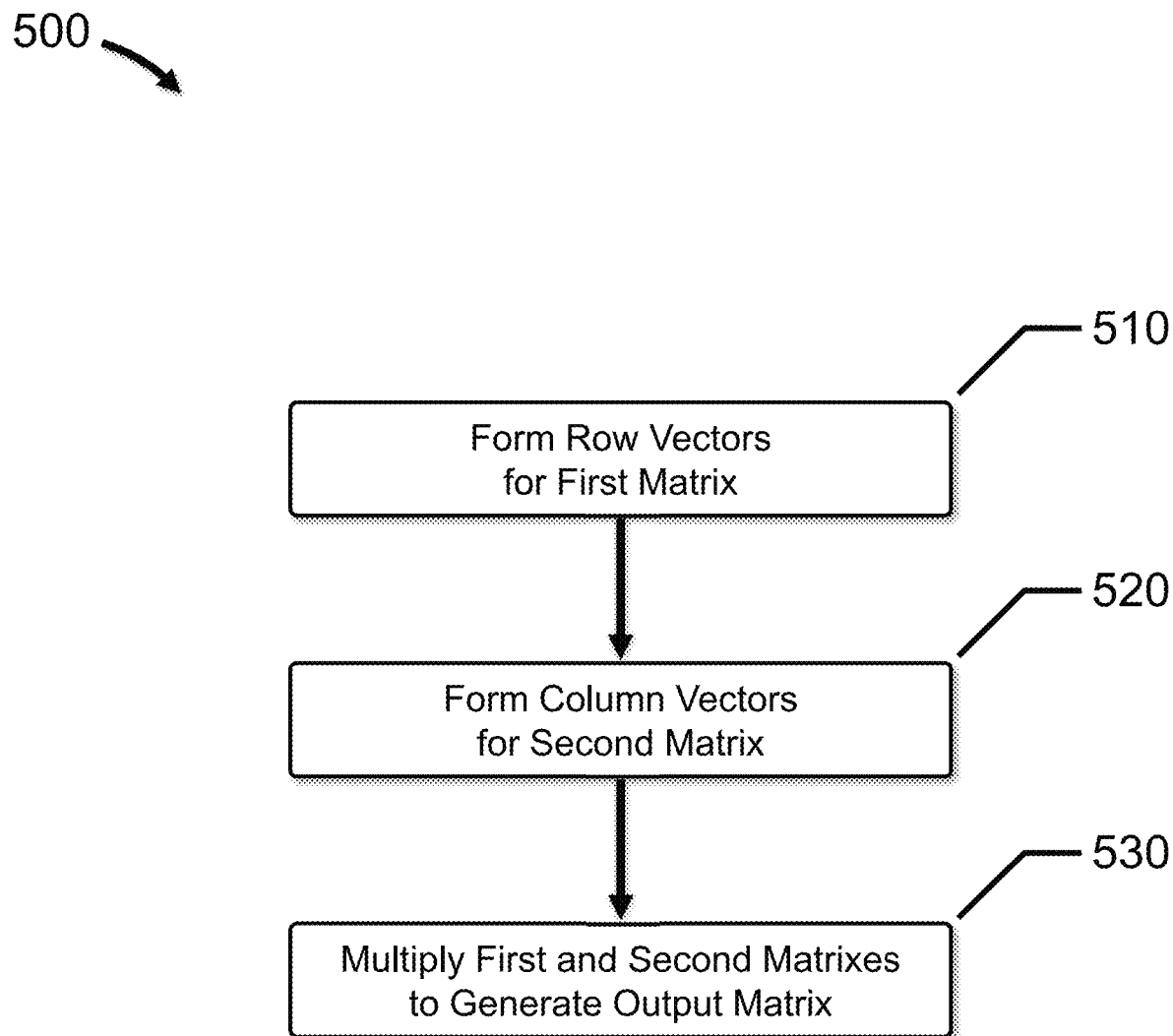
FIGS. 17A and 17B depict flow diagrams presenting functionality for multiplying matrices, in accordance with embodiments of the present disclosure.
Figure 17B:
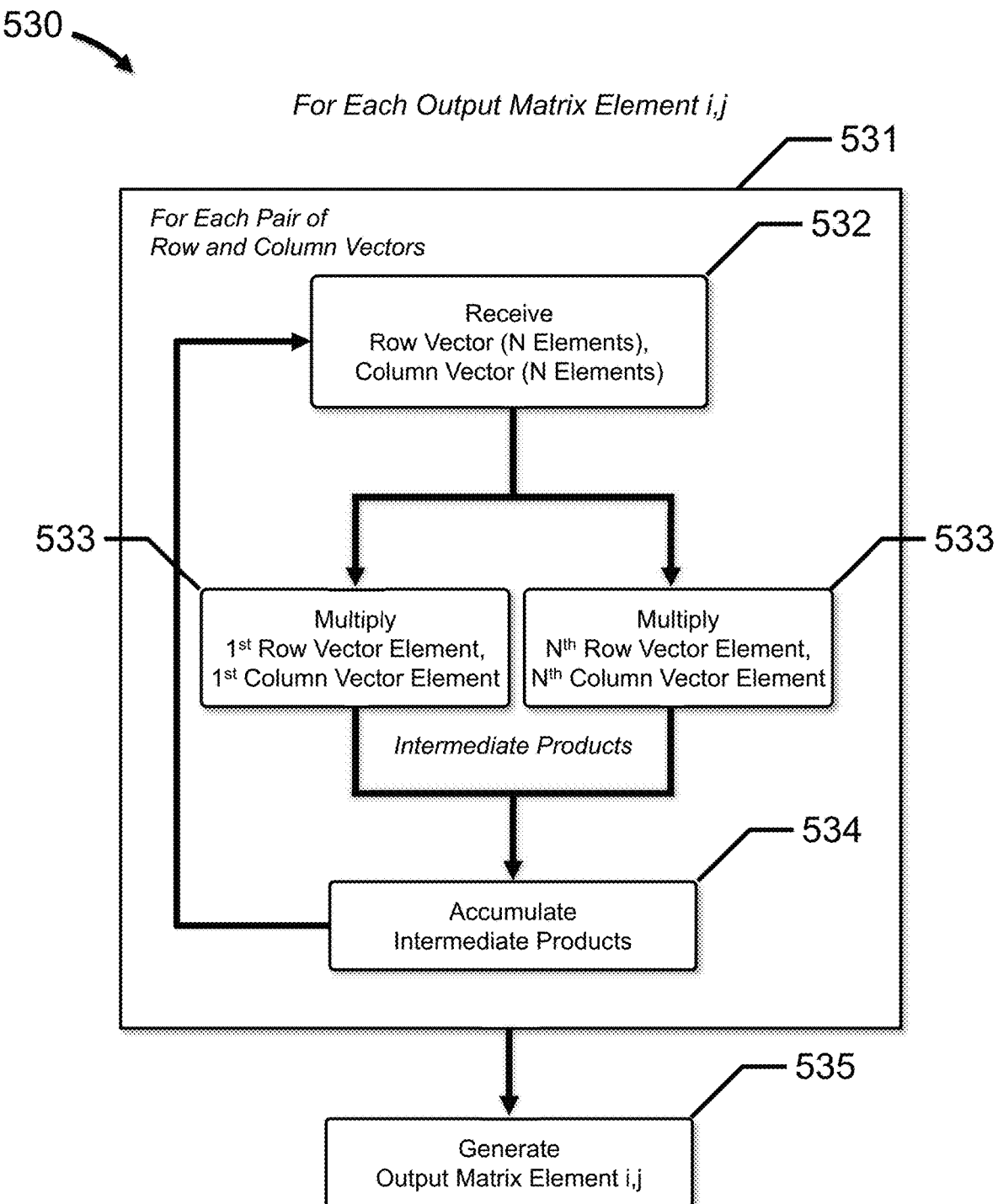

FIGS. 17A and 17B depict flow diagrams presenting functionality for multiplying matrices, in accordance with embodiments of the present disclosure.

FIG. 17A depicts flow diagram 500, in accordance with an embodiment of the present disclosure.

At 510, elements of each row of a first matrix are formed into a plurality of row vectors, such as, for example, a first row vector including elements $a_{1,1}$, $a_{1,2}$ of matrix 20, a second row vector including elements $a_{2,1}$, $a_{2,2}$ of matrix 20, a third row vector including elements $a_{1,3}$, $a_{1,4}$ of matrix 20, a fourth row vector including elements $a_{2,3}$, $a_{2,4}$ of matrix 20, a fifth row vector including elements $a_{3,1}$, $a_{3,2}$ of matrix 20, a sixth row vector including $a_{4,1}$, $a_{4,2}$ of matrix 20, a seventh row vector including elements $a_{3,3}$, $a_{3,4}$ of matrix 20 and an eighth row vector including $a_{4,3}$, $a_{4,4}$ of matrix 20. Each row vector has the same number of elements, such as, for example, two elements, and each row vector has at least two elements.

At 520, elements of each column of a second matrix are formed into a plurality of column vectors, such as, for example, a first column vector including elements $w_{1,1}$, $w_{2,1}$ of matrix 30, a second column vector including elements $w_{1,2}$, $w_{2,2}$ of matrix 30, a third column vector including elements $w_{3,1}$, $w_{4,1}$ of matrix 30, a fourth column vector including elements $w_{3,2}$, $w_{4,2}$ of matrix 30, a fifth column vector including elements $w_{1,3}$, $w_{2,3}$ of matrix 30, a sixth column vector including $w_{1,4}$, $w_{2,4}$ of matrix 30, a seventh column vector including elements $w_{3,3}$, $w_{4,3}$ of matrix 30 and an eighth column vector including $w_{3,4}$, $w_{4,4}$ of matrix 30. Each row vector has the same number of elements, such as, for example, two elements, and each row vector has at least two elements.

At 530, the first matrix and the second matrix are multiplied to generate an output matrix, such as matrix 40. For each element i,j of the output matrix, a dot product of the $i^{th}$ row of the first matrix and the $j^{th}$ column of the second matrix is calculated by multiplying each row vector formed from the $i^{th}$ row of the first matrix with a corresponding column vector formed from the $j^{th}$ column of the second matrix to generate intermediate products, and accumulating the intermediate products into a scalar value.

FIG. 17B depicts flow diagram for functional block 530, in accordance with an embodiment of the present disclosure.

Functional block 530 includes process loop 531, which iterates the output matrix element i,j dot product calculation for each pair of row and column vectors. Generally, there may be M pairs of row and column vectors, each vector including N elements. In embodiments depicted in FIGS. 7 through 13, there are 2 elements in each row vector, 2 elements in each column vector and 2 pairs of row and column vectors. Within process loop 531, the functionality for calculating the dot product for output matrix element i,j includes functional blocks 532, 533 and 534. Functional block 535 generates each output matrix element i,j based on the accumulated intermediate products calculated by process loop 531. For example, the dot product for element $o_{1,1}$ of matrix 40 is calculated over 2 VMAC processing cycles by the upper left $VMAC^2$ unit 250 of $VMAC^2$ zone 204.

At 532, the row vector and column vector pair is received. For example, during the first VMAC processing cycle, the upper left $VMAC^2$ unit 250 of $VMAC^2$ zone 204 receives the first row vector $a_{1,1}$, $a_{1,2}$ and the first column vector $w_{1,1}$, $w_{2,1}$. During the second VMAC processing cycle, the upper left $VMAC^2$ unit 250 of $VMAC^2$ zone 204 receives the second row vector $a_{1,3}$, $a_{1,4}$ and the second column vector $w_{3,1}$, $w_{4,1}$.

At 533, each row vector element is multiplied with a corresponding column vector element to generate an intermediate product. For example, during the first VMAC processing cycle, the upper left VMAC² unit 250 of VMAC² zone 204 multiplies the first element of the first row vector $a_{1,1}$ with the first element of the first column vector $w_{1,1}$ to generate a first intermediate product, $ip_1$, and multiplies the second element of the first row vector $a_{1,2}$ with the second element of the first column vector $w_{2,1}$ to generate a second intermediate product, $ip_2$. During the second VMAC processing cycle, the upper left VMAC² unit 250 of VMAC² zone 204 multiplies the first element of the second row vector $a_{1,3}$ with the first element of the second column vector $w_{3,1}$ to generate a third intermediate product, $ip_3$, and multiplies the second element of the second row vector $a_{1,4}$ with the second element of the second column vector $w_{4,1}$ to generate a fourth intermediate product, $ip_4$.

At 534, the first and second intermediate products are accumulated. For example, during the first VMAC processing cycle, the upper left VMAC² unit 250 of VMAC² zone 204 accumulates the intermediate products $ip_1$ and $ip_2$, and during the second VMAC processing cycle, the upper left VMAC² unit 250 of VMAC² zone 204 accumulates the intermediate products $ip_3$ and $ip_4$. The final value in accumulator register 256 is therefore the sum of the intermediate products $ip_1$, $ip_2$, $ip_3$ and $ip_4$, which is a scalar value.

At 535, each output matrix element i,j is generated based on the accumulated intermediate products. For example, at the end of the second VMAC processing cycle, 100% of the dot product for the first element $o_{1,1}$ of matrix 40 has been calculated by the upper left VMAC² unit 250 of VMAC² zone 204, and the accumulated result is output to vector register 242 as the element $o_{1,1}$ of matrix 40.

Embodiments of the present disclosure advantageously provide a system, apparatus and computer-based method for multiplying matrices. The embodiments described above and summarized below are combinable.

In one embodiment, a system includes a memory, a processor coupled to the memory, and a matrix multiply accelerator (MMA) coupled to the memory and the processor. The memory is configured to store a first matrix including a plurality of elements, a second matrix including a plurality of elements, and an output matrix including a plurality of elements. The processor is configured to form the elements of each row of the first matrix into a plurality of row vectors, and form the elements of each column of the second matrix into a plurality of column vectors. Each row vector has the same number of elements, and each row vector has at least two elements. Each column vector has the same number of elements. The MMA is configured to multiply the first matrix and the second matrix to generate the output matrix, including, for each element i,j of the output matrix, calculate a dot product of the $i^{th}$ row of the first matrix and the $j^{th}$ column of the second matrix by multiplying each row vector formed from the $i^{th}$ row of the first matrix with a corresponding column vector formed from the $j^{th}$ column of the second matrix to generate intermediate products, and accumulate the intermediate products into a scalar value.

In one embodiment, a matrix multiply accelerator (MMA) includes a first vector register to store the row vectors of the first matrix, a second vector register to store the column vectors of the second matrix, an output vector register to store the output matrix, and an array of vector multiply and accumulate (VMAC) units, coupled to the first vector register, the second vector register and the output vector register. Each VMAC unit is coupled to at least two row vector signal lines and at least two column vector signal lines. Each VMAC unit is configured to calculate the dot product for one element i,j of the output matrix by multiplying each row vector formed from the $i^{th}$ row of the first matrix with a corresponding column vector formed from the $j^{th}$ column of the second matrix to generate intermediate products, and accumulate the intermediate products into a scalar value.

In one embodiment, each VMAC unit includes a first multiplier circuit to multiply a first row vector element from the first matrix and a respective first column vector element from the second matrix to generate a first intermediate product; a second multiplier circuit to multiply a second row vector element from the first matrix and a respective second column vector element from the second matrix to generate a second intermediate product; and an accumulator circuit, coupled to the first and second multiplier circuits, to receive the first and second intermediate products, to accumulate the first and second intermediate products into the scalar value, and to output the dot product.

In one embodiment, the array of VMAC units is arranged as a plurality of zones, each zone including at least four VMAC units, at least two row vector registers and at least two column vector registers; each row vector register is coupled to at least two row vector signal lines and is configured to store one row vector; and each column vector register is coupled to at least two column vector signal lines and is configured to store one column vector.

In one embodiment, each row of the first matrix has an element sequence, and the vectors formed from each row of the first matrix have an element sequence that is different than the element sequence of the respective row.

In one embodiment, each column of the second matrix has an element sequence, and the vectors formed from each column of the second matrix have an element sequence that is different than the element sequence of the respective column.

In one embodiment, the first matrix has m rows and n columns; the second matrix has n rows and p columns; the output matrix has m rows and p columns; and n is evenly divisible by the number of elements in each row vector.

In one embodiment, a computer-based method for multiplying matrices includes forming elements of each row of a first matrix into a plurality of row vectors, each row vector having a same number of elements, each row vector having at least two elements; forming elements of each column of a second matrix into a plurality of column vectors, each column vector having the same number of elements; and multiplying the first matrix and the second matrix to generate an output matrix including, for each element i,j of the output matrix, calculating a dot product of the $i^{th}$ row of the first matrix and the $j^{th}$ column of the second matrix by multiplying each row vector formed from the $i^{th}$ row of the first matrix with a corresponding column vector formed from the $j^{th}$ column of the second matrix to generate intermediate products, and accumulating the intermediate products into a scalar value.

In one embodiment, the computer-based method includes storing the row vectors of the first matrix in a first vector register; storing the column vectors of the second matrix in a second vector register; and storing the elements i,j of the output matrix in an output vector register, where a vector multiply and accumulate (VMAC) unit, coupled to at least two row vector signal lines and at least two column vector signal lines, calculates the dot product of the $i^{th}$ row of the first matrix and the $j^{th}$ column of the second matrix by multiplying, using a first multiplier circuit, a first row vector element from the first matrix and a respective first column vector element from the second matrix to generate a first intermediate product; multiplying, using a second multiplier circuit, a second row vector element from the first matrix and a respective second column vector element from the second matrix to generate a second intermediate product; and accumulating, using an accumulator circuit coupled to the first and second multiplier circuits, the first and second intermediate products into the scalar value.

In one embodiment, a non-transitory computer-readable medium stores instructions that, when executed by a processor cause the processor to multiply matrices according to the computer-based methods described above.

While implementations of the disclosure are susceptible to embodiment in many different forms, there is shown in the drawings and will herein be described in detail specific embodiments, with the understanding that the present disclosure is to be considered as an example of the principles of the disclosure and not intended to limit the disclosure to the specific embodiments shown and described. In the description above, like reference numerals may be used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," "for example," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms. Also, the terms apparatus, device, system, etc. may be used interchangeably in this text.

The many features and advantages of the disclosure are apparent from the detailed specification, and, thus, it is intended by the appended claims to cover all such features and advantages of the disclosure which fall within the scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A system, comprising:
a memory configured to store a first matrix including a plurality of elements, a second matrix including a plurality of elements, and an output matrix including a plurality of elements;
a processor, coupled to the memory, configured to:
form the elements of each row of the first matrix into a plurality of row vectors, each row vector having a same number of elements, each row vector having elements from a same row, and
form the elements of each column of the second matrix into a plurality of column vectors, each column vector having the same number of elements, each column vector having elements from a same column; and
a matrix multiply accelerator (MMA), coupled to the processor and the memory, including a first vector register configured to store the plurality of row vectors, and a second vector register configured to store the plurality of column vectors,
where the MMA is configured to multiply the first matrix and the second matrix to generate the output matrix, including:
for each element i,j of the output matrix, calculate a dot product of the $i^{th}$ row of the first matrix and the $j^{th}$ column of the second matrix by multiplying each row vector formed from the $i^{th}$ row of the first matrix with a corresponding column vector formed from the $j^{th}$ column of the second matrix to generate intermediate products, and accumulate the intermediate products into a scalar value, where the first vector register includes one or more rows, each row configured to store row vectors from different rows of the first matrix, and where the second vector register includes one or more rows, each row configured to store column vectors from different columns of the second matrix.

2. The system according to claim 1, where the MMA includes:
an output vector register to store the output matrix; and
an array of vector multiply and accumulate (VMAC) units, coupled to the first vector register, the second vector register and the output vector register,
where each VMAC unit is coupled to at least two row vector signal lines and at least two column vector signal lines, and each VMAC unit is configured to calculate the dot product for one element of the output matrix.

3. The system according to claim 2, where each VMAC unit includes:
a first multiplier circuit to multiply a first row vector element from the first matrix and a respective first column vector element from the second matrix to generate a first intermediate product;
a second multiplier circuit to multiply a second row vector element from the first matrix and a respective second column vector element from the second matrix to generate a second intermediate product; and
an accumulator circuit, coupled to the first and second multiplier circuits, to receive the first and second intermediate products, to accumulate the first and second intermediate products into the scalar value, and to output the dot product.

4. The system according to claim 3, where:
the array of VMAC units is arranged as a plurality of zones, each zone including at least four VMAC units, at least two row vector registers and at least two column vector registers;
each row vector register is coupled to said at least two row vector signal lines and is configured to store one row vector; and
each column vector register is coupled to said at least two column vector signal lines and is configured to store one column vector.

5. The system according to claim 3, where each row of the first matrix has an element sequence, and the plurality of row vectors have an element sequence that is different than the element sequence of the respective row.

6. The system according to claim 3, where each column of the second matrix has an element sequence, and the plurality of column vectors have an element sequence that is different than the element sequence of the respective column.

7. The system according to claim 3, where:
the first matrix has m rows and n columns;
the second matrix has n rows and p columns;
the output matrix has m rows and p columns; and
n is evenly divisible by the number of elements in each row vector.

8. A matrix multiplication array (MMA), comprising:
a first vector register configured to store row vectors of a first matrix, each row vector including elements from a same row of the first matrix, the first vector register including one or more rows, each row configured to store row vectors from different rows of the first matrix;
a second vector register configured to store column vectors of a second matrix, each column vector including elements from a same column of the second matrix, the second vector register including one or more rows, each row configured to store column vectors from different columns of the second matrix;
an output vector register configured to store an output matrix; and
an array of vector multiply and accumulate (VMAC) units, coupled to the first vector register, the second vector register and the output vector register, where each VMAC unit is coupled to at least two row vector signal lines and at least two column vector signal lines, and each VMAC unit is configured to calculate a dot product for one element i,j of the output matrix, including:
calculate the dot product of the $i^{th}$ row of the first matrix and the $j^{th}$ column of the second matrix by multiplying each row vector formed from the $i^{th}$ row of the first matrix with a corresponding column vector formed from the $j^{th}$ column of the second matrix to generate intermediate products, and accumulate the intermediate products into a scalar value.

9. The MMA according to claim 8, where each VMAC unit includes:
a first multiplier circuit to multiply a first row vector element from the first matrix and a respective first column vector element from the second matrix to generate a first intermediate product;
a second multiplier circuit to multiply a second row vector element from the first matrix and a respective second column vector element from the second matrix to generate a second intermediate product; and
an accumulator circuit, coupled to the first and second multiplier circuits, to accumulate the first and second intermediate products into the scalar value, and to output the dot product.

10. The MMA according to claim 9, where:
the array of VMAC units is arranged as a plurality of zones, each zone including at least four VMAC units, at least two row vector registers and at least two column vector registers;
each row vector register is coupled to said at least two row vector signal lines and is configured to store one row vector; and
each column vector register is coupled to said at least two column vector signal lines and is configured to store one column vector.

11. The MMA according to claim 9, where each row of the first matrix has an element sequence, and the row vectors of the first matrix have an element sequence that is different than the element sequence of the respective row.

12. The MMA according to claim 9, where each column of the second matrix has an element sequence, and the column vectors of the second matrix have an element sequence that is different than the element sequence of the respective column.

13. The MMA according to claim 9, where:
the first matrix has m rows and n columns;
the second matrix has n rows and p columns;
the output matrix has m rows and p columns; and
n is evenly divisible by the number of elements in each row vector.

14. A computer-based method for multiplying matrices, comprising:

at a processor:
  forming elements of each row of a first matrix into a plurality of row vectors, each row vector having a same number of elements, each row vector having elements from a same row;
  forming elements of each column of a second matrix into a plurality of column vectors, each column vector having the same number of elements, each column vector having elements from a same column; and
at a matrix multiply accelerator (MMA):
  storing the plurality of row vectors in a first vector register including one or more rows, each row configured to store row vectors from different rows of the first matrix;
  storing the plurality of column vectors in a second vector register including one or more rows, each row configured to store column vectors from different columns of the second matrix;
  multiplying the first matrix and the second matrix to generate an output matrix, including:
    for each element i,j of the output matrix, calculating a dot product of the $i^{th}$ row of the first matrix and the $j^{th}$ column of the second matrix by multiplying each row vector formed from the $i^{th}$ row of the first matrix with a corresponding column vector formed from the $j^{th}$ column of the second matrix to generate intermediate products, and accumulating the intermediate products into a scalar value.

15. The computer-based method according to claim 14, further comprising:
  storing the elements i,j of the output matrix in an output vector register,
  where a vector multiply and accumulate (VMAC) unit, coupled to at least two row vector signal lines and at least two column vector signal lines, calculates the dot product of the $i^{th}$ row of the first matrix and the $j^{th}$ column of the second matrix.

16. The computer-based method according to claim 15, where each VMAC unit calculates the dot product of the $i^{th}$ row of the first matrix and the $j^{th}$ column of the second matrix by:
  multiplying, using a first multiplier circuit, a first row vector element from the first matrix and a respective first column vector element from the second matrix to generate a first intermediate product;
  multiplying, using a second multiplier circuit, a second row vector element from the first matrix and a respective second column vector element from the second matrix to generate a second intermediate product; and
  accumulating, using an accumulator circuit coupled to the first and second multiplier circuits, the first and second intermediate products into the scalar value.

17. The computer-based method according to claim 15, where each row of the first matrix has an element sequence, and the plurality of row vectors have an element sequence that is different than the element sequence of the respective row.

18. The computer-based method according to claim 15, where each column of the second matrix has an element sequence, and the plurality of column vectors have an element sequence that is different than the element sequence of the respective column.

19. The computer-based method according to claim 15, where:
  the first matrix has m rows and n columns;
  the second matrix has n rows and p columns;
  the output matrix has m rows and p columns; and
  n is evenly divisible by the number of elements in each row vector.

20. A non-transitory computer-readable medium storing instructions that, when executed by the processor cause the processor to multiply matrices according to the computer-based method of claim 14.

* * * * *